United States Patent
Williams

(10) Patent No.: US 9,454,364 B2
(45) Date of Patent: Sep. 27, 2016

(54) MOBILE APPLICATION OPTIMIZATION PLATFORM

(71) Applicant: Accenture Global Services Limited, Dublin (IE)

(72) Inventor: Murray Williams, New York, NY (US)

(73) Assignee: Accenture Global Services Limited, Dublin (IE)

( * ) Notice: Subject to any disclaimer, the term of this patent is extended or adjusted under 35 U.S.C. 154(b) by 75 days.

(21) Appl. No.: 14/310,705

(22) Filed: Jun. 20, 2014

(65) Prior Publication Data

US 2015/0026663 A1     Jan. 22, 2015

Related U.S. Application Data

(60) Provisional application No. 61/847,365, filed on Jul. 17, 2013.

(51) Int. Cl.
| | |
|---|---|
| *G06F 9/44* | (2006.01) |
| *G06F 11/36* | (2006.01) |
| *G06Q 10/06* | (2012.01) |
| *G06Q 30/02* | (2012.01) |

(52) U.S. Cl.
CPC . *G06F 8/71* (2013.01); *G06F 8/70* (2013.01); *G06F 11/3668* (2013.01); *G06Q 10/06* (2013.01); *G06Q 30/0241* (2013.01)

(58) Field of Classification Search
CPC ......... G06F 8/70; G06F 8/71; G06F 11/3668
See application file for complete search history.

(56) References Cited

U.S. PATENT DOCUMENTS

| | | |
|---|---|---|
| 6,934,748 B1 | 8/2005 | Louviere et al. |
| 7,308,497 B2 | 12/2007 | Louviere et al. |
| 7,676,580 B2 * | 3/2010 | Hill ........................ G06F 9/546 709/206 |
| 7,739,594 B2 | 6/2010 | Vasilik |

(Continued)

OTHER PUBLICATIONS

Fulcher, Amy, et al. Developing a mobile application as an extension education tool: A case study using IPMPro. [Online] Aug. 2013, HortTechnology vol. 23 No. 4, [Retrieved from the Internet] <http://horttech.ashspublications.org/content/23/4/402.full.pdf+html> pp. 402-406.*

(Continued)

*Primary Examiner* — Thuy Dao
*Assistant Examiner* — Ravi K Sinha
(74) *Attorney, Agent, or Firm* — Harrity & Harrity, LLP

(57) ABSTRACT

A device may receive configuration information for an experiment associated with optimizing an application. The configuration information may identify a group of experimental treatments and information identifying a target event. The device may identify an experimental treatment to be implemented in the application, and may implement the experimental treatment in the application. The device may collect response information based on implementing the experimental treatment. The device may detect the target event associated with the experiment, indicating that the response information is to be provided to an experiment server. The device may determine that the experiment server is unreachable and may store the response information. The response information may be stored to allow the response information to be provided to the experiment server at a later time. The response information may be provided to the experiment server to permit the experiment server to determine a result of the experiment.

20 Claims, 17 Drawing Sheets

(56) References Cited

U.S. PATENT DOCUMENTS

| | | | |
|---|---|---|---|
| 8,166,458 B2* | 4/2012 | Li | G06F 9/5038 709/223 |
| 8,375,297 B2 | 2/2013 | Williams | |
| 8,467,987 B1* | 6/2013 | Davidson | G06F 11/3672 455/408 |
| 8,566,648 B2* | 10/2013 | Schroeder | G06F 11/2294 714/38.14 |
| 8,997,081 B1* | 3/2015 | Manion | G06F 8/71 717/168 |
| 9,038,043 B1* | 5/2015 | Fleetwood | G06Q 30/0246 717/151 |
| 9,189,378 B1* | 11/2015 | Ryan | G06F 11/3668 |
| 2004/0103396 A1* | 5/2004 | Nehab | G06F 11/3684 717/127 |
| 2004/0205781 A1* | 10/2004 | Hill | G06F 9/546 719/328 |
| 2005/0096950 A1* | 5/2005 | Caplan | G06Q 10/06314 705/7.24 |
| 2005/0187930 A1* | 8/2005 | Subramanian | G06F 11/3668 |
| 2006/0248121 A1* | 11/2006 | Cacenco | G06F 8/71 |
| 2007/0168970 A1* | 7/2007 | Li | G06F 9/5038 717/124 |
| 2008/0097843 A1* | 4/2008 | Menon | G06Q 30/02 705/14.1 |
| 2009/0049065 A1* | 2/2009 | Weissman | G06F 8/70 |
| 2011/0283270 A1* | 11/2011 | Gass | G06F 8/71 717/168 |
| 2012/0060142 A1* | 3/2012 | Fliess | G06F 8/70 717/102 |
| 2012/0198279 A1 | 8/2012 | Schroeder | |
| 2012/0239444 A1 | 9/2012 | Williams | |
| 2013/0066670 A1* | 3/2013 | Krishnan Nair | G06Q 10/0639 705/7.23 |
| 2013/0078983 A1 | 3/2013 | Doshi et al. | |
| 2013/0117731 A1* | 5/2013 | LeSuer | G06F 11/3668 717/125 |
| 2013/0179858 A1* | 7/2013 | Mecke | G06F 11/3688 717/106 |
| 2013/0239089 A1* | 9/2013 | Eksten | G06F 8/70 717/120 |
| 2014/0137080 A1* | 5/2014 | Huang | G06F 9/44505 717/121 |
| 2014/0201714 A1* | 7/2014 | Vaidyan | G06F 11/3668 717/124 |
| 2014/0258894 A1* | 9/2014 | Brown | G06F 8/71 715/762 |
| 2015/0172146 A1* | 6/2015 | Mahaffey | G06F 8/70 709/224 |

OTHER PUBLICATIONS

Roy Sandberg, Mark Rollins, Making Sure Your App Will Succeed, [Online] Jul. 25, 2013, The Business of Android Apps Development, [Retrieved from the Internet] <http://download.springer.com/static/pdf/167/chp%253A10.1007%252F978-1-4302-5008-1_2.pdf> pp. 15-30.*

K. W. Tracy, Mobile Application Development Experiences on Apple??s iOS and Android OS, [Online] Jul. 25, 2012, in IEEE Potentials, vol. 31, No. 4, [Retrieved from the Internet] <http://ieeexplore.ieee.org/stamp/stamp.jsp?tp=&arnumber=6248786&isnumber=6248759> pp. 30-34.*

Accenture, "IBM WebSphere Commerce Showcase", http://demo-us.ado.ai.accenture.com/ibm-wcs/video.html, Jan. 30, 2014, 3 pages.

Notification of Transmittal of the International Search Report and The Written Opinion of the International Searching Authority, or the Declaration corresponding to PCT/US2014/046943, mailed on Jan. 8, 2015, 10 pages.

* cited by examiner

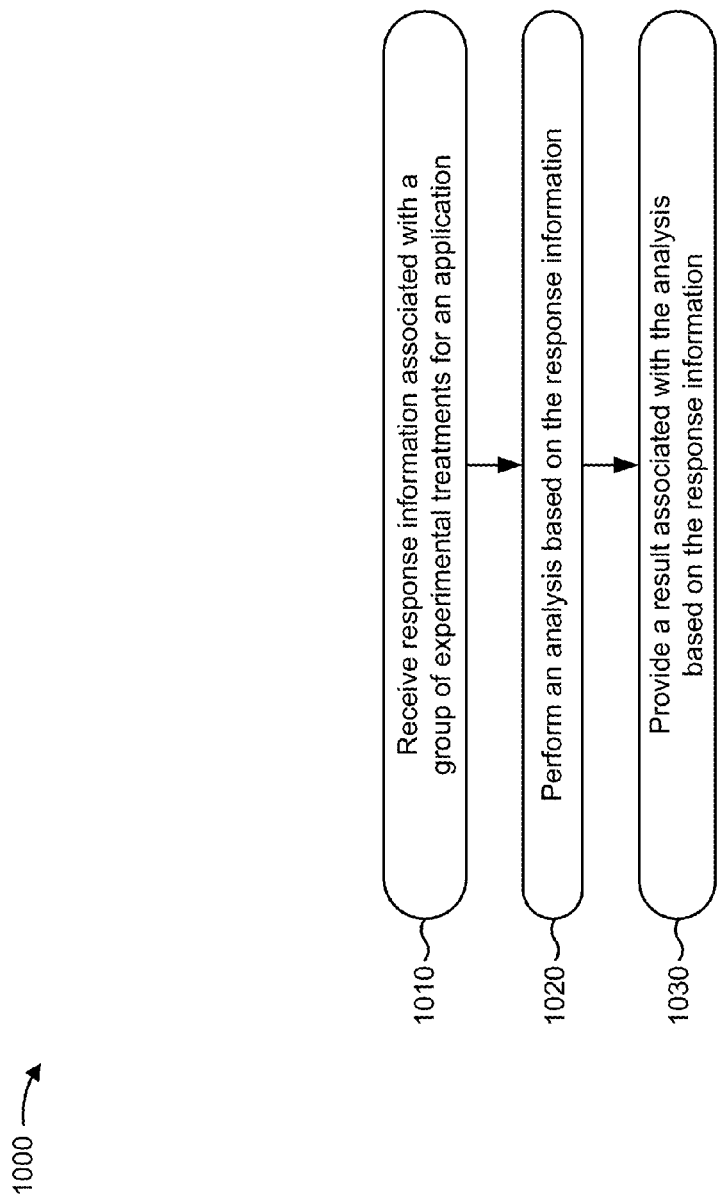

MOBILE APPLICATION OPTIMIZATION PLATFORM

RELATED APPLICATION

This application claims priority under 35 U.S.C. §119 to U.S. Provisional Patent Application No. 61/847,365, filed on Jul. 17, 2013, the content of which is incorporated by reference herein in its entirety.

BACKGROUND

A mobile application is application software that is designed to execute on a mobile device, such as a smart phone, a tablet, or the like. Mobile applications may be designed with consideration for demands and constraints of the mobile device, and may also be designed to take advantage of capabilities of the mobile device.

SUMMARY

According to some possible implementations, a device may include one or more processors to: receive configuration information associated with an experiment associated with optimizing an application, where the configuration information may identify a group of experimental treatments associated with the experiment, and where the configuration information may include information identifying a target event associated with the experiment; identify an experimental treatment, of the group of experimental treatments, to be implemented in the application; implement the experimental treatment in the application; collect response information, associated with the experimental treatment, based on implementing the experimental treatment; detect the target event associated with the experiment, where the target event being detected may indicate that the response information is to be provided to an experiment server associated with the experiment; determine, after detecting the target event, that the experiment server is unreachable; and store the response information based on determining that the experiment server is unreachable, where the response information may be stored to allow the response information to be provided to the experiment server at a later time, where the response information may be provided to the experiment server to permit the experiment server to analyze the response information to determine a result of the experiment.

According to some possible implementations, a computer-readable medium may store one or more instructions that, when executed by one or more processors, cause the one or more processors to: receive configuration information associated with an experiment and an application, where the configuration information may include information that identifies a group of experimental treatments associated with the experiment and information that identifies a target event associated with the experiment; identify an experimental treatment, of the group of experimental treatments, to be implemented in the application; cause the experimental treatment to be implemented in the application; collect response information, associated with the experimental treatment, based on causing the experimental treatment to be implemented; receive an indication to provide the response information, where the indication may be associated with an occurrence of the target event; determine, after receiving the indication, that the response information cannot be provided to the experiment server; and store, based on determining that the response information cannot be provided to the experiment server, the response information to allow the response information to be provided to the experiment server at a later time, where the response information may be provided to the experiment server to permit the experiment server to analyze the response information and determine a result associated with experiment.

According to some possible implementations, a method may include: receiving, by a device, experiment information, where the experiment information may be associated with an experiment for optimizing an application, and where the experiment information may include information associated with a group of attributes associated with the experiment; generating, by the device, configuration information based on the group of attributes associated with the experiment information, where the configuration information may include information that identifies a group of experimental treatments associated with the experiment; providing, by the device, the configuration information, where the configuration information may be provided to cause the group of experimental treatments to be implemented in the application by a group of test devices; receiving, by the device, response information, associated with the group of experimental treatments, where the response information may be provided by the group of test devices; analyzing, by the device, the response information to determine a result associated with the experiment; and providing, by the device, the result to allow the application to be optimized based on the result.

BRIEF DESCRIPTION OF THE DRAWINGS

FIG. 10 is a flow chart of an example process for analyzing response information, associated with a group of experimental treatments for an application, and providing a result associated with analyzing the response information.

DETAILED DESCRIPTION

Figure 1A:
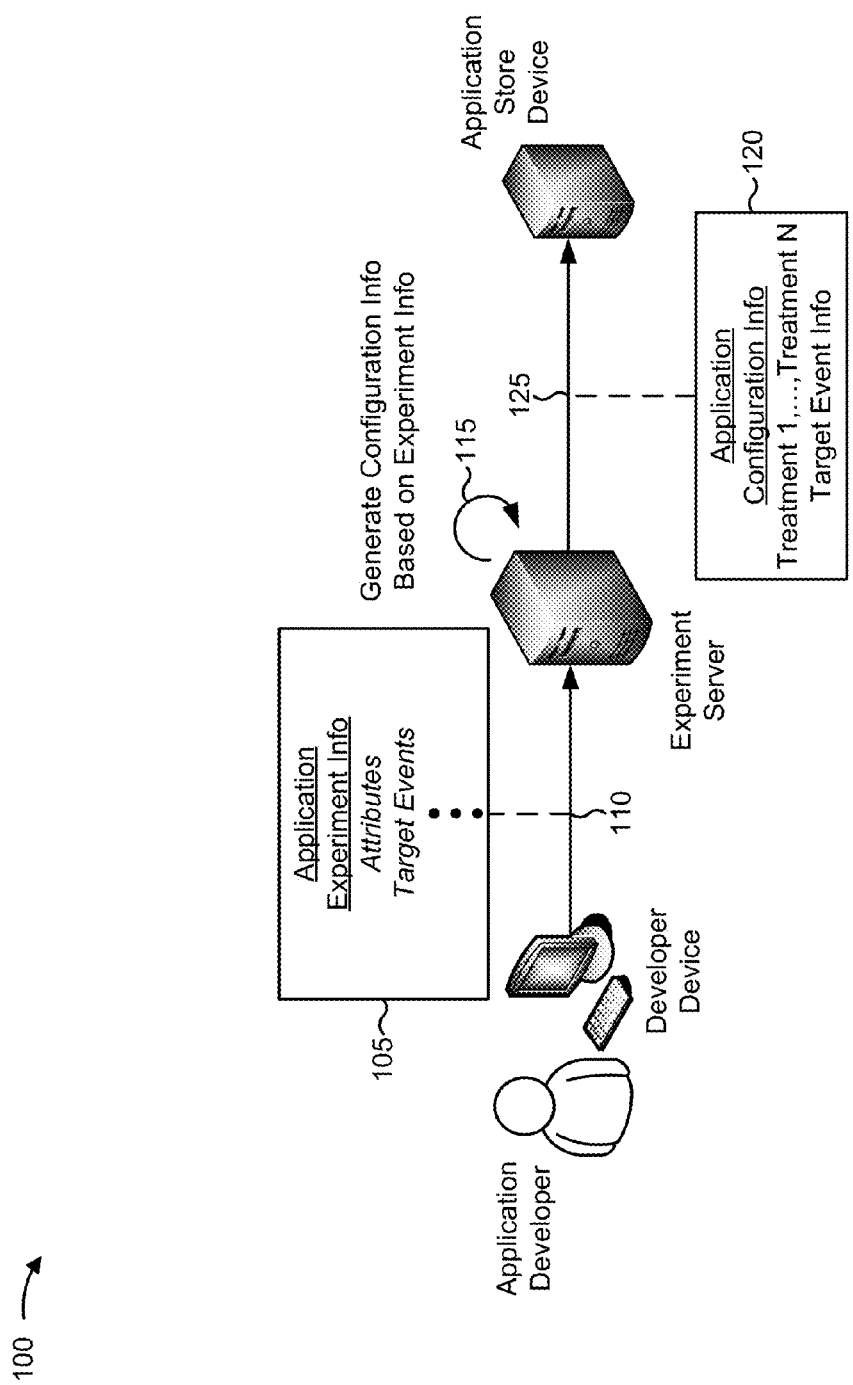
FIGS. 1A-1C are diagrams of an overview of an example implementation described herein.

The following detailed description of example implementations refers to the accompanying drawings. The same reference numbers in different drawings may identify the same or similar elements.

An application developer may wish to experiment with various configurations of an application (e.g., a mobile application) in order to determine which configuration is optimal for a goal (e.g., increasing sales, increasing ad revenue, etc.). In order to achieve this, the application developer may design, via an experiment server (e.g., a server device that hosts a primary experiment engine), an experimental campaign that identifies a group of attributes and levels, associated with the experiment, that may be used to generate a group of experimental treatments. Each experimental treatment may include experimental variations of attributes associated with the application (e.g., functions associated with the application, aesthetics associated with the application, etc.).

Information associated with the experimental treatments may be provided to a group of test devices (e.g., smart phones, tablet computers, etc.), and each test device may be assigned an experimental treatment of the group of experimental treatments. In some cases, the test device may be assigned an experimental treatment by the experiment server (e.g., when the test device is able to communicate with the experiment server via a network). However, if the test device is unable to communicate with the experiment server, a secondary experiment engine, hosted by the test device, may assign (e.g., randomly, systematically, etc.) an experimental treatment to the test device.

Each test device may then execute the application and implement the assigned experimental treatment, and may collect (e.g., via the secondary experiment engine) response information associated with the experimental treatment (e.g., information about how a user of the test device responded to the experimental treatment, etc.).

However, when the test device is not connected to the experiment server (e.g., when the test device is disconnected from a network), the test device may be unable to provide the response information and/or other information (e.g., descriptive information associated with the user, information that identifies the experimental treatment that was used, etc.) to the experiment server. As such, the test device may be configured to store the response information until the test device is able to communicate with the experiment server, at which point the test device may provide the response information and/or the other information to the experiment server. The experiment server may then analyze the response information and/or the other information associated with the test device and/or a user of the test device (e.g., along with response information and/or other information associated with other test devices). Implementations described herein may allow an experiment server to conduct experiments, associated with optimizing an application, on a test device when the test device is unable to communicate with the experiment server (e.g., when the test device is disconnected from the network).

Figure 1B:
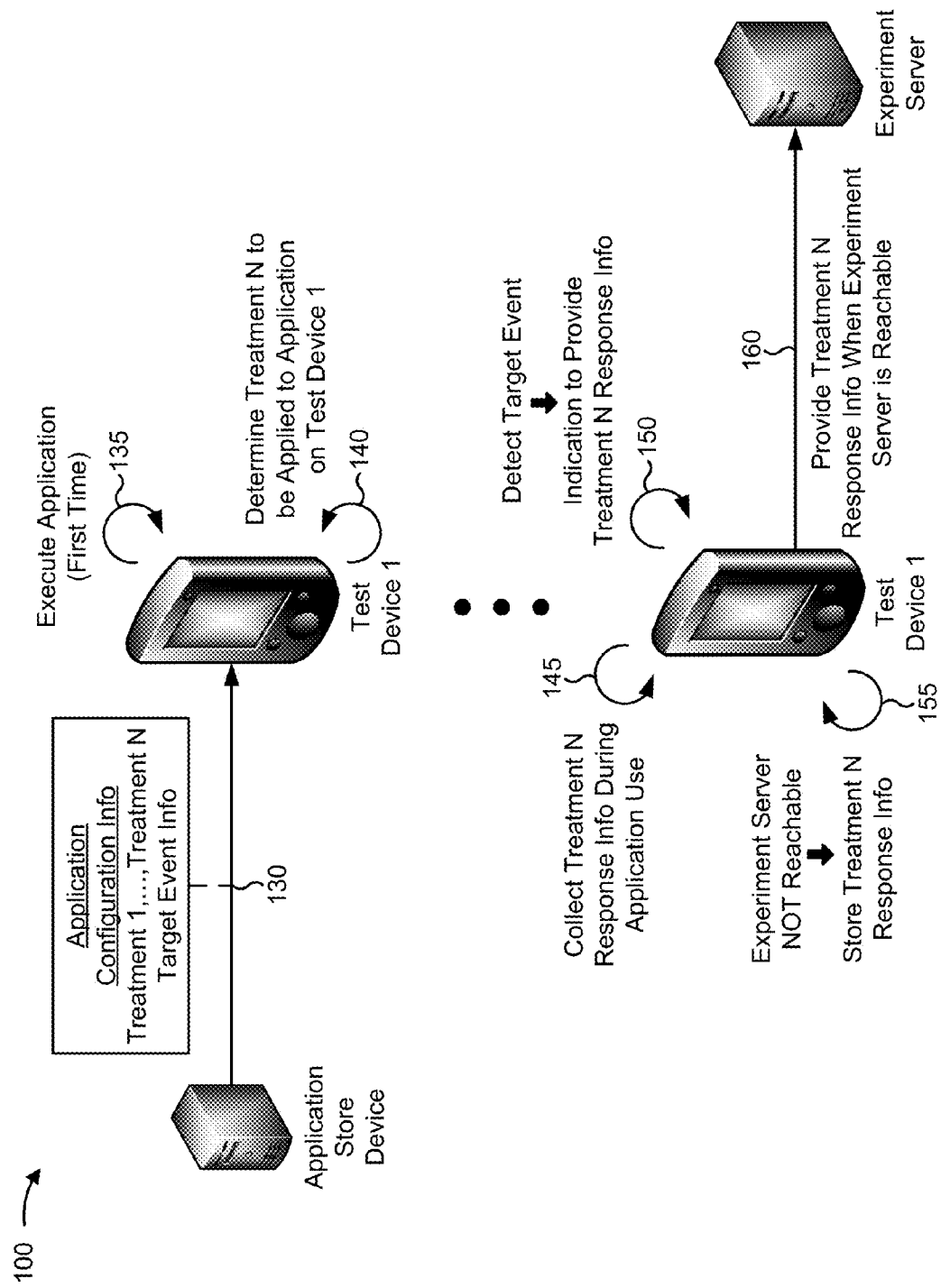
Figure 1C:
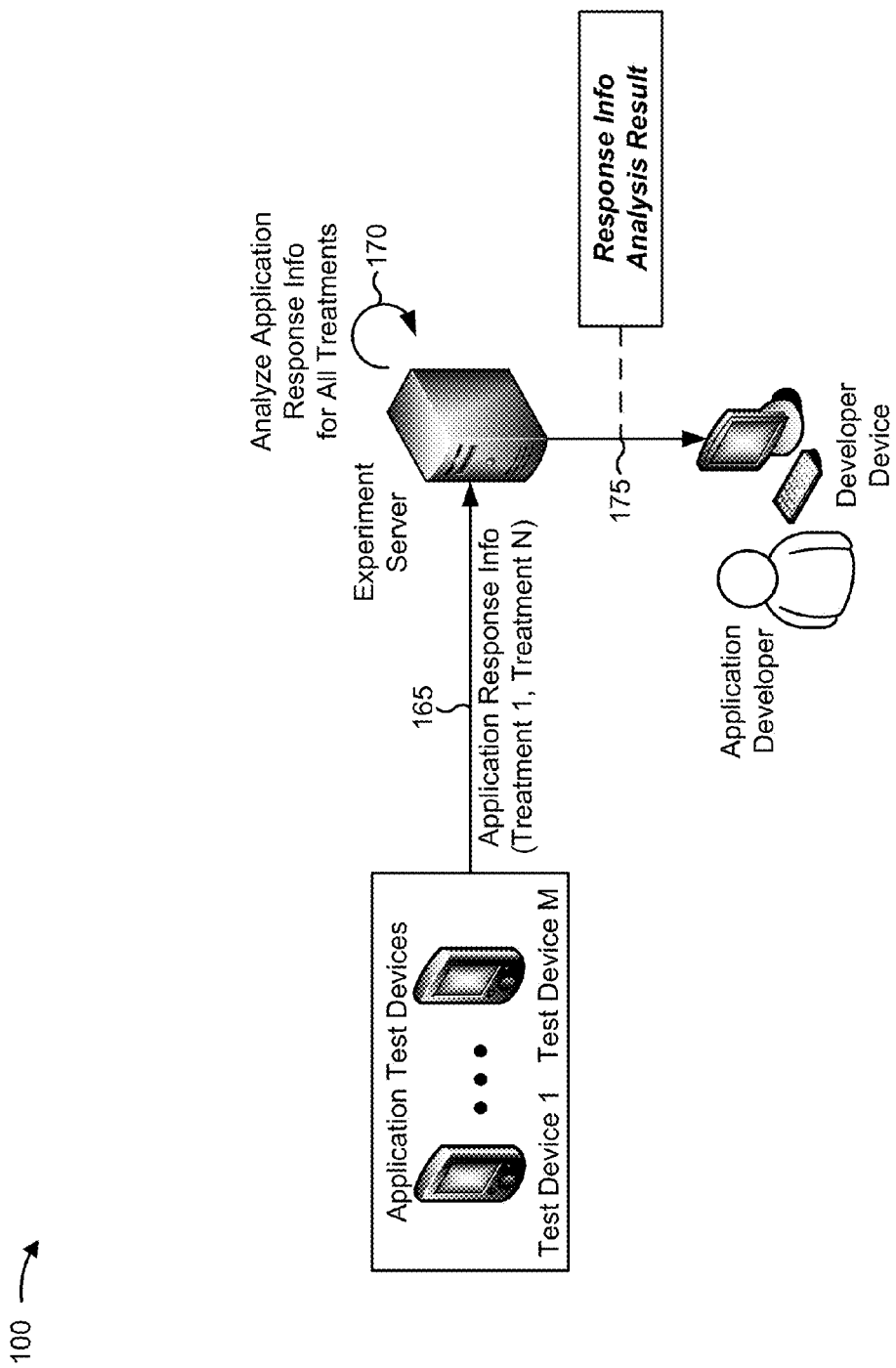

FIGS. 1A-1C are diagrams of an overview of an example implementation 100 described herein. For the purposes of example implementation 100, assume that an application developer wishes to conduct an experiment, associated with optimizing an application, by causing a group of test devices to execute the application implementing a group of experimental treatments for the application.

As shown in FIG. 1A, an application developer may provide, to a developer device (e.g., a desktop computer, a laptop computer, a smart phone, a tablet, etc.), experiment information associated with the application. As shown by reference number 105 the experiment information may include information associated with attributes associated with the application and may include information associated with target events associated with the application (e.g., information associated with a user behavior that the application developer wishes to monitor). As shown by reference number 110, the developer device may provide the experiment information to an experiment server associated with conducting the experiment.

As shown by reference number 115, the experiment server may generate configuration information based on the experiment information. As shown by reference number 120, the configuration information may include information that identifies a group of experimental treatments (e.g., determined based on information associated with the attributes included in the experiment information), identified as treatment 1 through treatment N, and may include information associated with the target events. As shown by reference number 125, the experiment server may provide the configuration information, associated with the application, to an application store device (e.g., such that the group of test devices may have access to the configuration information).

For the purposes of FIG. 1B, assume that a test device, test device 1, is in the process of installing the application to allow the application to execute on the test device (e.g., after the test device requests the application from the application store device). As shown by reference number 130, the application store device may provide the configuration information, associated with the application, to test device 1 (e.g., along with other information associated with installing and/or executing the application on the test device). As shown by reference number 135, test device 1 may receive the configuration information, install the application, and execute the application for the first time. As shown by reference number 140, test device 1 may identify an experimental treatment (e.g., treatment N) that is to be applied to the application when test device 1 executes the application. In some implementations, test device 1 may determine which experimental treatment is to be applied based on sending a request to, and receiving a response from, the experiment server (e.g., when test device 1 is connected to a network that allows test device 1 to communicate with the experiment server). Additionally, or alternatively, test device 1 may determine which experimental treatment is to be applied based on the configuration information (e.g., when test device 1 is not connected to the network and test device 1 selects an experimental treatment identified in the configuration information).

As further shown in FIG. 1B, and by reference number 145, test device 1 (e.g., the secondary experiment engine) may collect response information (e.g., based on user behavior) associated with the application that has implemented treatment N. As shown by reference number 150, test device 1 may detect a target event (e.g., identified in the configuration information) associated with the application, which may indicate that test device 1 is to provide the treatment N response information, collected by test device 1, to the experiment server. As shown by reference number 155, test device 1 may determine that the experiment server is not reachable (e.g., when test device 1 is disconnected from the network, when the experiment server is unavailable, etc.), and may store the treatment N response information (e.g., in a memory location of test device 1). As shown by reference number 160, test device 1 may determine, at a later time, that the experiment server is reachable (e.g., when test device 1 reconnects to the network, when the experiment server becomes available, etc.), and test device 1 may provide the treatment N response information to the experiment server.

For the purposes of FIG. 1C, assume that each test device, of a group of test devices (e.g., test device 1 through test device M), has applied an experimental treatment, of the group of experimental treatments, to the application (e.g., such that response information for each experimental treatment has been collected by one or more test devices). As shown by reference number 165, each test device may provide, to the experiment server, response information associated with the experimental treatments corresponding to each test device. As shown by reference number 170, the experiment server may receive the response information associated with the experimental treatment, and may analyze the response information (e.g., by performing a statistical analysis based on the response information). As shown by reference number 175, the experiment server may provide, to the developer device, a result associated with analyzing the response information (e.g., such that the application developer may optimize the application based on the result).

In this way, an experiment server may conduct an experiment, associated with optimizing an application, on a test device when the test device is unable to communicate with the experiment server (e.g., when the test device is disconnected from the network). An application developer, associated with the application, may then optimize the application based on a result of the experiment.

Figure 2:
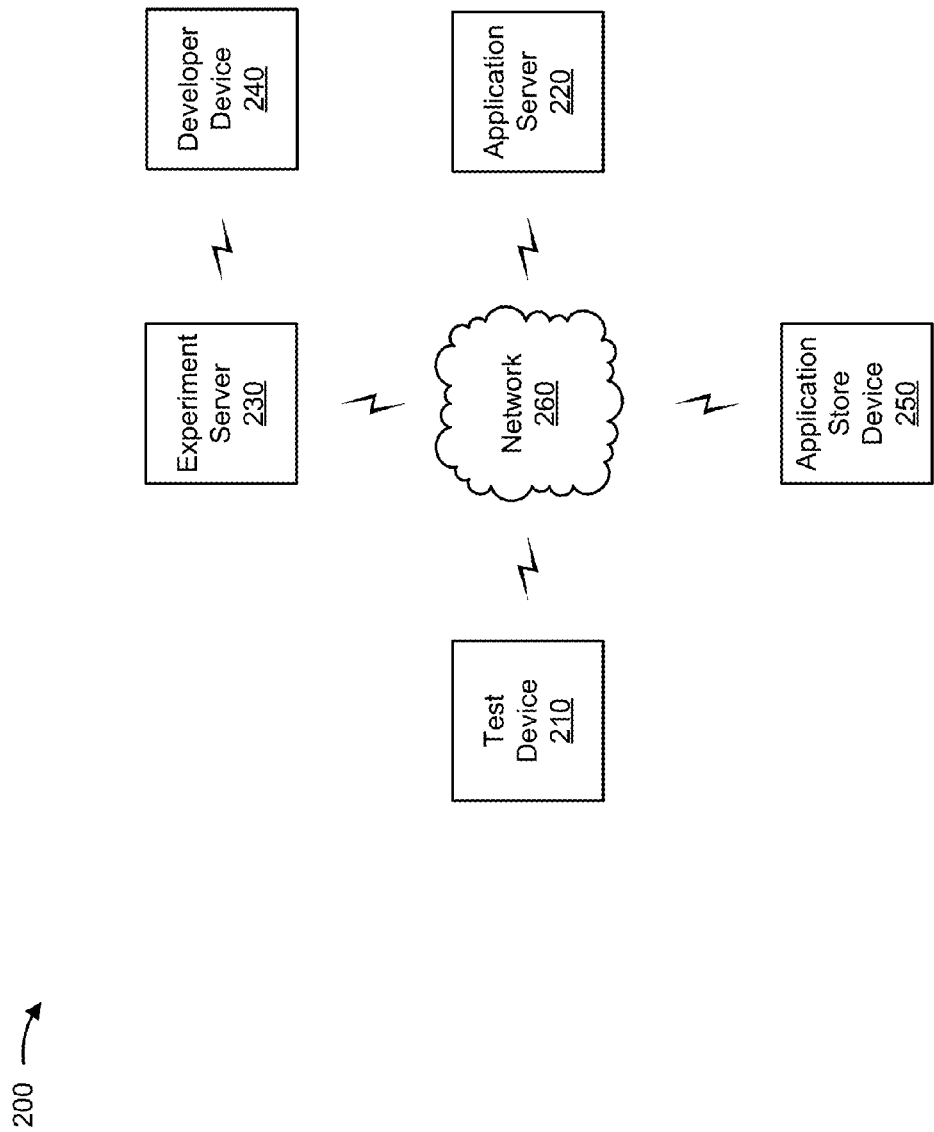
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a test device 210, an application server 220, an experiment server 230, a developer device 240, an application store device 250, and a network 260. Devices of environment 200 may interconnect via wired connections, wireless connections, or a combination of wired and wireless connections.

Test device 210 may include a device capable of receiving, generating, storing, processing, and/or providing information, such as information associated with an application (e.g., a mobile application). For example, test device 210 may include a tablet computer, a handheld computer, a mobile phone (e.g., a smart phone, a radiotelephone, etc.), a desktop computer, a laptop computer, or a similar device. In some implementations, test device 210 may receive information from and/or transmit information to application server 220, experiment server 230, and/or application store device 250. In some implementations, aspects of an experimental treatment (e.g., application configuration variations) may dictate a configuration of the application executing on test device 210. Additionally, or alternatively, test device 210 may be capable of collecting and/or storing response information associated with an experimental treatment.

Application server 220 may include one or more devices capable of receiving, generating, storing, processing, and/or providing information, such as information that may be required for test device 210 (e.g., information associated with an application executing on test device 210). For example, application server 220 may include one or more computing devices, such as one or more server devices. In some implementations, an application that executes on test device 210 may require the presence of application server 220 to provide operational information (e.g., flight information, hotel price rates, etc.) associated with the application. In some implementations, aspects of an experimental treatment (e.g., application configuration variations) may dictate a configuration of application server 220. Additionally, or alternatively, application server 220 may be capable of collecting and/or storing response information associated with an experimental treatment.

Experiment server 230 may include one or more devices capable of receiving, generating, storing, processing, and/or providing information associated with an application executing on test device 210. For example, experiment server 230 may include one or more computing devices, such one or more server devices. In some implementations, experiment server 230 may be capable of receiving response information, associated with a group of experimental treatments for an application, and analyzing the response information. Additionally, or alternatively, experiment server 230 may be capable of receiving experimental information, generating configuration information based on the experimental information, and/or managing an experiment associated with the experiment information.

Developer device 240 may include a device capable of receiving, generating, storing, processing, and/or providing information, such as experiment information associated with an application. For example, developer device 240 may include a desktop computer, a laptop computer, a tablet computer, a handheld computer, a mobile phone (e.g., a smart phone, a radiotelephone, etc.), a server, or a similar device. In some implementations, developer device 240 may receive information from and/or transmit information to experiment server 230 and/or application store device 250. In some implementations, developer device 240 may be capable of receiving, from an application developer, experiment information associated with an experiment to be conducted by experiment server 230.

Additionally, or alternatively, developer device 240 may allow the application developer to explore a possible experimental treatment and/or perform quality assurance associated with the possible experiment. For example, developer device 240 may host a quality assurance application that allows the application developer to input information associated with a possible experimental treatment (e.g., such that developer device 240 implements the possible experimental treatment when developer device 240 executes the application). The application developer may view and/or modify the possible experimental treatment by providing input to the developer device. In some implementations, the quality assurance application may allow the application developer to view and/or modify the possible experimental treatment based on a gesture (e.g., a shake, a particular finger swipe, etc.) associated with developer device 240. In this way, developer device 240 may allow the application developer to view and/or modify a possible experimental treatment, as the experimental treatment would appear when implemented in the application, such that the application developer may perform quality assurance associated with the possible experimental treatment before the experimental treatment is implemented in test device 210.

Application store device 250 may include one or more devices capable of receiving, generating, storing, processing, and/or providing information, such as information associated with an application. For example, application store device 250 may include one or more computing devices, such as one or more server devices. In some implementations, application store device 250 may store information that, when provided to test device 210, may allow test device 210 to install and/or execute the application. In some implementations, application store device 250 may receive information from and/or transmit information to experiment device 230.

Network 260 may include one or more wired and/or wireless networks. For example, network 260 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
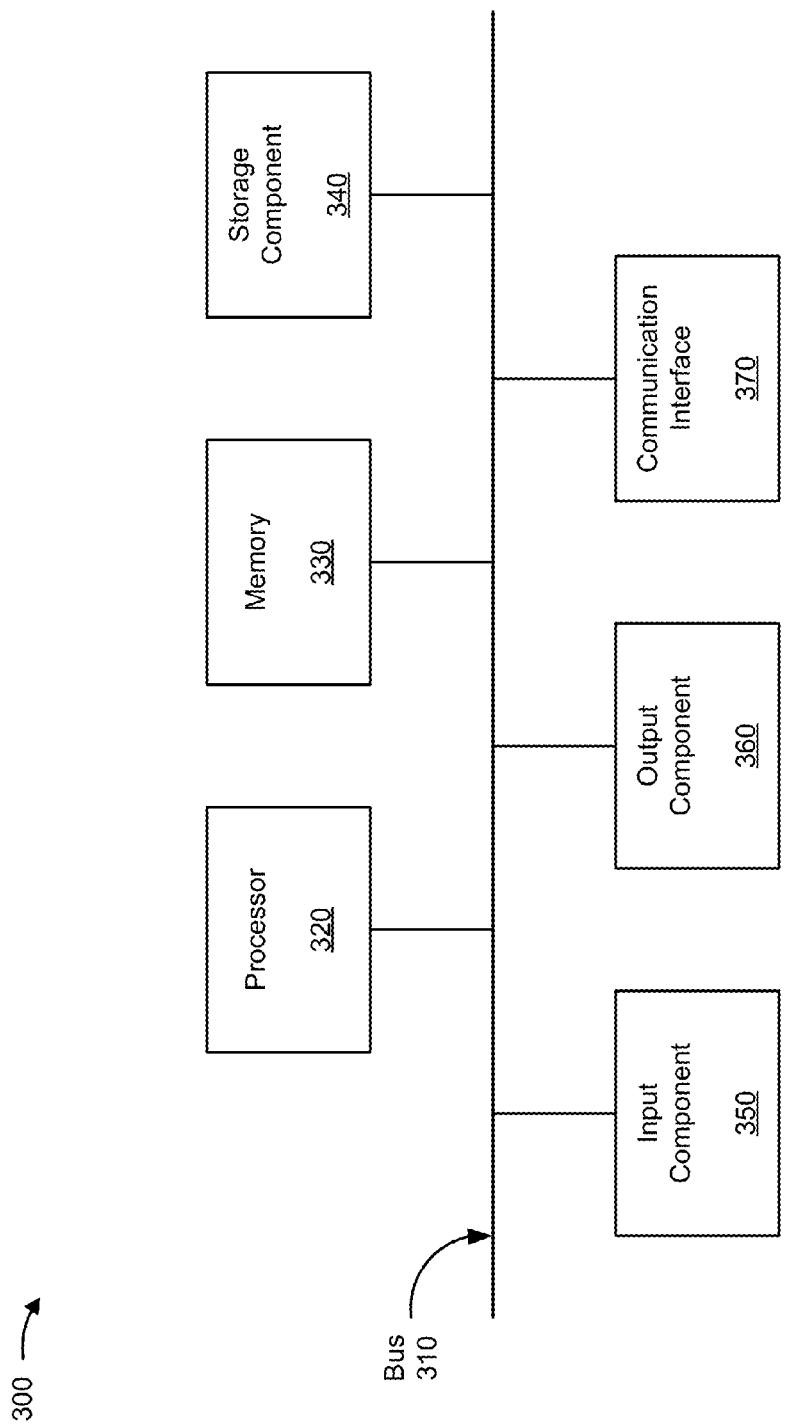
FIG. 3 is a diagram of example components of one or more devices of FIG. 2.

FIG. 3 is a diagram of example components of a device 300. Device 300 may correspond to test device 210, application server 220, experiment server 230, developer device 240, and/or application store device 250. In some implementations, test device 210, application server 220, experiment server 230, developer device 240, and/or application store device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
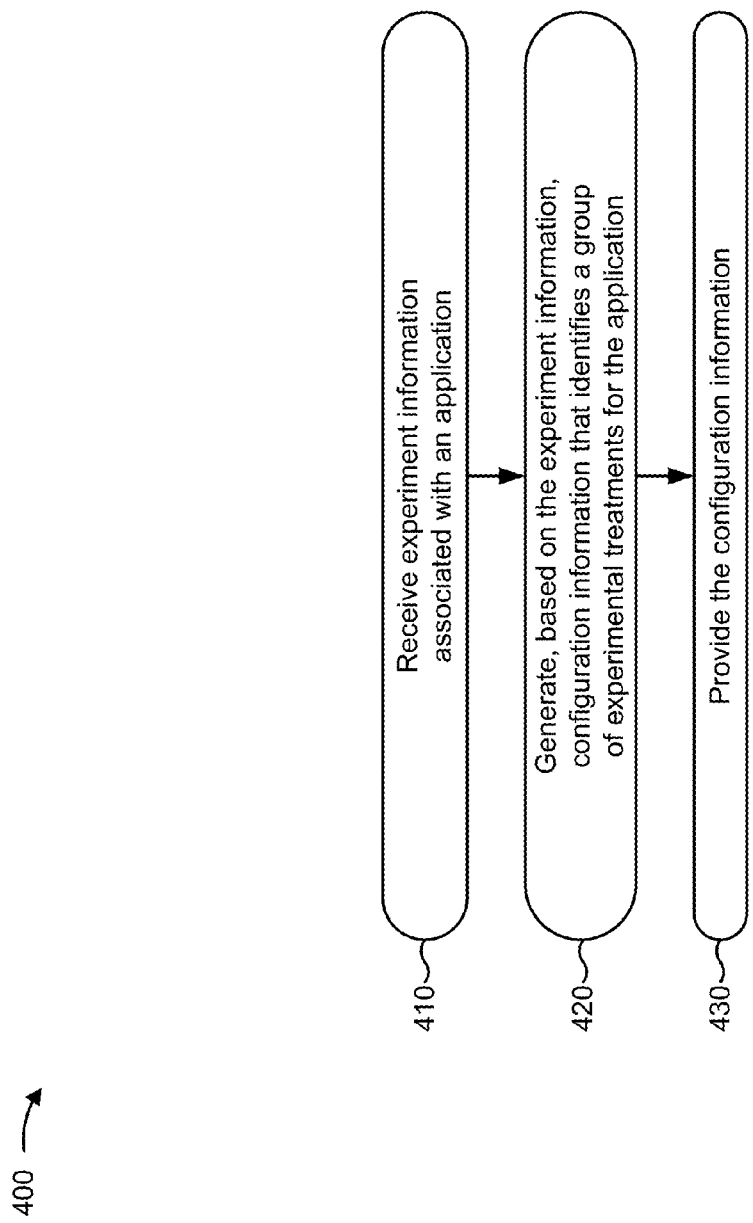
FIG. 4 is a flow chart of an example process for receiving experiment information, associated with an application, and generating a group of experimental treatments based on the experiment information.

FIG. 4 is a flow chart of an example process 400 for receiving experiment information, associated with an application, and generating a group of experimental treatments based on the experiment information. In some implementations, one or more process blocks of FIG. 4 may be performed by experiment server 230. In some implementations, one or more process blocks of FIG. 4 may be performed by another device or a group of devices separate from or including experiment server 230, such as another device included in environment 200.

As shown in FIG. 4, process 400 may include receiving experiment information associated with an application (block 410). For example, experiment server 230 may receive experiment information associated with an application. In some implementations, experiment server 230 may receive the experiment information after an application developer provides, via developer device 240, the experiment information. Additionally, or alternatively, experiment server 230 may receive the experiment information from another device.

Experiment information may include information associated with an experiment to be performed on an application.

In some implementations, the experiment information may identify one or more attributes associated with the experiment (e.g., one or more configurations of the application that are to be involved in the experiment). In some implementations, an attribute may be associated with aesthetics of the application (e.g., an arrangement of user interface input elements, a color scheme associated with the application, a font associated with the application, etc.), content associated with the application (e.g., an amount of textual information, a tone of textual information, a number of images associated with the application, etc.), a functional aspect of the application (e.g., a set of application code, a codec used by the application, etc.), advertisement information associated with the application (e.g., an ad campaign associated with the application, a discount offered to the user, an incentive offered to the user, etc.), and/or another configuration of the application. In some implementations, the experiment information may include information associated with multiple attributes such that experiment server 230 may conduct multi-variant testing. The experiment information may also include information that identifies multiple levels associated with an attribute. For example, the experiment information may include information that identifies a first level (e.g., a default configuration) associated with an attribute, a second level (e.g., a first alternative configuration) associated with the attribute, and so on.

Additionally, or alternatively, the experiment information may include information that identifies a target event associated with an application. A target event may include an event that, when detected by test device 210, causes test device 210 to provide response information (e.g., information, associated with the treatment for the application, collected by test device 210) to experiment server 240. For example, the target event may be associated with a user making a purchase via the application (e.g., booking a hotel, buying a plane ticket, etc.), interacting with an advertisement (e.g., clicking on an advertisement banner, requesting information regarding an advertisement), signing up for a service (e.g., joining a mailing list, joining a rewards program, etc.). In some implementations, the experiment information may include information associated with multiple target events.

Additionally, or alternatively, the experiment information may include timing information associated with the experiment. For example, the experiment information may identify when an experiment is to begin (e.g., a start date, a start time, a version of the application that will trigger the experiment to start, etc.), when an experiment is to end (e.g., an end date, an end time, a version of the application that will trigger the experiment to end, etc.) and/or another type of information.

In some implementations, the experiment information may include information associated with multiple experiments (e.g., the experiment information may include multiple sets of attributes associated with multiple experiments). In other words, the experiment information may include information that allows experiment device 230 to perform multiple experiments associated with the application.

In some implementations, the application developer may provide the experiment information via developer device 240. For example, developer device 240 may display a user interface that allows the application developer to provide experiment information associated with the application, and the application developer may provide the experiment information via the user interface.

As further shown in FIG. 4, process 400 may include generating, based on the experiment information, configuration information that identifies a group of experimental treatments for the application (block 420). For example, experiment server 230 may generate configuration information that identifies a group of experimental treatments for the application. In some implementations, experiment server 230 may generate the configuration information after experiment server 230 receives the experiment information. Additionally, or alternatively, experiment server 230 may generate the configuration information when experiment server 230 receives, from another device (e.g., developer device 240), information indicating that experiment server 230 is to generate the configuration information.

Configuration information may include information, associated with executing an experiment on an application, that identifies a group of experimental treatments that are to be applied to the application. An experimental treatment may include a combination of attribute levels that may be applied to an application. For example, assume that the experiment information includes two attributes (e.g., attribute 1 and attribute 2), and that each of the two attributes includes two levels (e.g., an attribute 1 default level, an attribute 1 alternative level, an attribute 2 default level, and an attribute 2 alternative level). In this example, the configuration information may include four treatments (e.g., attribute 1 default level paired with attribute 2 default level, attribute 1 default level paired with attribute 2 alternative level, attribute 1 alternative level paired with attribute 2 default level, and attribute 1 alternative level paired with attribute 2 alternative level).

In some implementations, the configuration information may be associated with an experimental library (e.g., a software library) associated with the application. For example, the configuration information (e.g., the experimental treatments identified in the configuration information) may be implemented using an experimental library provided to test device 210 and/or application server 220 during installation of the application.

In some implementations, experiment server 230 may generate the configuration information based on the experiment information. For example, experiment server 230 may generate the configuration information such that each possible combination of attribute levels is included in the configuration information. In this way, the configuration information may include hundreds, or thousands, of treatments (e.g., as the number of attributes and/or levels increases). Additionally, or alternatively, experiment server 230 may generate the configuration information based on information that describes one or more treatments provided by the application developer. For example, the application developer may provide (e.g., via developer device 240) information that identifies a combination of attributes and/or levels to be included in the experiment, and experiment server 230 may generate the configuration information based on the information provided by the application developer. Additionally, or alternatively, the configuration information may include information associated with the target event associated with the experiment. Additionally, or alternatively, the configuration information may include the timing information associated with experiment.

As further shown in FIG. 4, process 400 may include providing the configuration information (block 430). For example, experiment server 230 may provide the configuration information. In some implementations, experiment server 230 may provide the configuration information after experiment server 230 generates the configuration information. Additionally, or alternatively, experiment server 230 may provide the configuration information after experiment server 230 receives an indication that experiment server 230 is to provide the configuration information from another device, such as developer device 240.

In some implementations, experiment server 230 may provide the configuration information such that the configuration information may be provided to test device 210 along with other information associated with the application. For example, experiment device 230 may provide the configuration information to application store device 250. In this example, application device 250 may receive the configuration information, and may provide the configuration information, along with other information (e.g., installation information, update information, etc.) associated with installing and/or executing the application, to test device 210 (e.g., when test device 210 indicates that the application is to be installed on test device 210). In other words, experiment server 230 may provide the configuration information such that the configuration information may be received during an installation of the application and/or an update of the application on test device 210.

Additionally, or alternatively, experiment server 230 may provide the configuration information to application server 220. For example, if the application implements a client-server topology (e.g., when the application requires communication between test device 210 and application server 220 while the application is executing), then the experiment may require response information gathered by application server 220. As such, experiment server 230 may provide the configuration information to application server 220, and application server 220 may store the configuration information.

In some implementations, experiment server 230 may provide the configuration information for storage by experiment server 230. For example, experiment server 230 may provide the configuration information to a memory location (e.g., a hard disk, RAM, etc.) associated with the application, the experiment, the application developer, etc. of experiment server 230, and the experiment server 230 may store the configuration information. In this way, experiment server 230 may retrieve the configuration information for later use.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
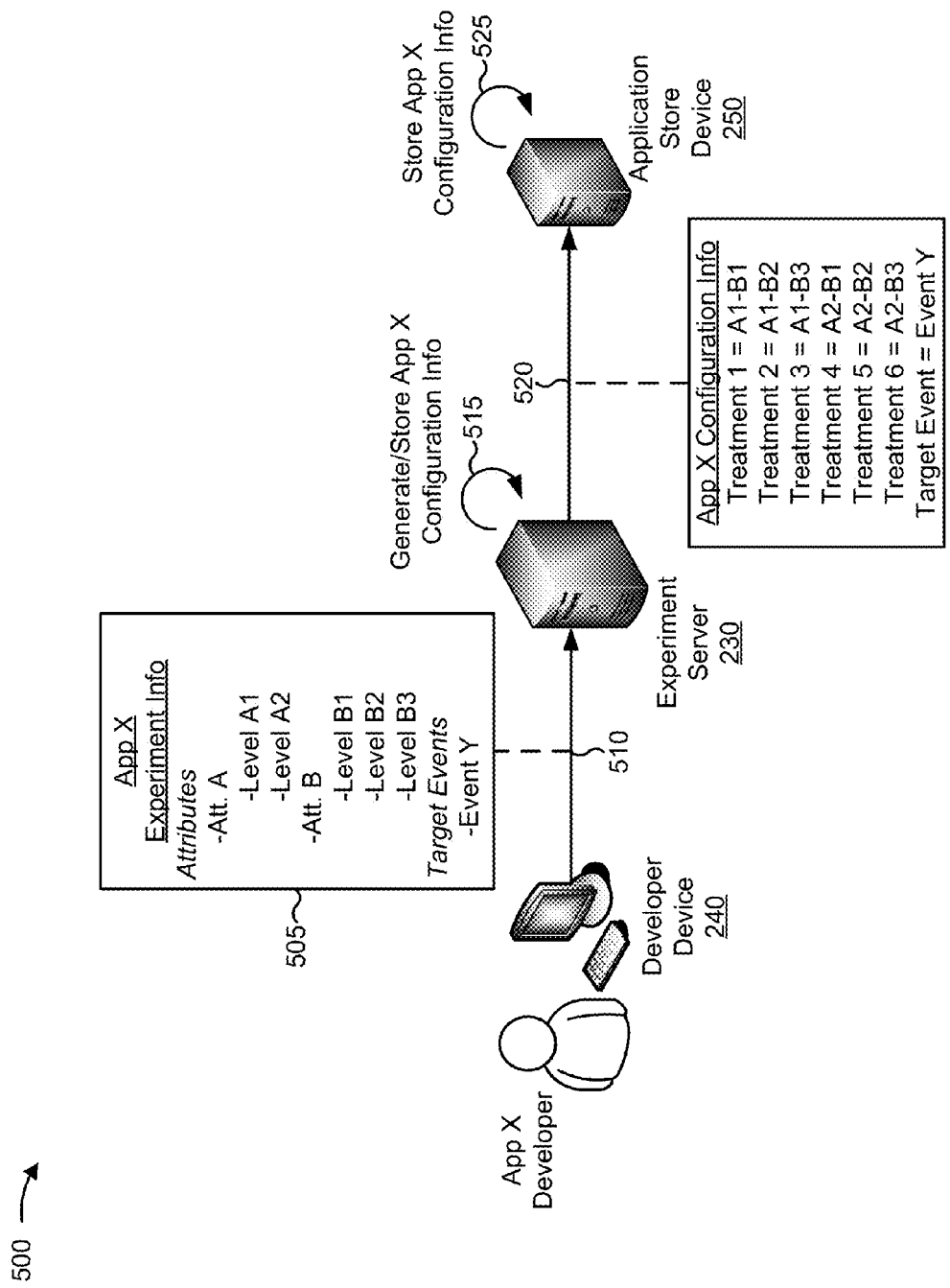
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that an application developer associated with an application, App X, wishes to conduct an experiment, associated with App X, based on a group of attributes associated with App X and a target event associated with App X.

As shown in FIG. 5, the application developer may provide (e.g., via a user interface of developer device 240) experiment information associated with App X. As shown by reference number 505, the experiment information may identify a first attribute (e.g., attribute A) associated with the experiment, and information associated with two levels of the first attribute (e.g., level A1 and level A2). As further shown, the experiment information may also identify a second attribute (e.g., attribute B) associated with the experiment, and information associated with three levels of the second attribute (e.g., level B1, level B2, level B3). As further shown, the experiment information may also include information associated with a target event (e.g., event Y) associated with the experiment. As shown by reference number 510, developer device 240 may provide the experiment information to experiment server 230.

As shown by reference number 515, experiment server 230 may receive the App X experiment information, and may generate and store configuration information associated with the App X experiment. For the purposes of example implementation 500, assume that experiment device 230 is configured to generate configuration information that includes all possible combinations of attribute levels for the experiment.

As shown by reference number 520, the App X configuration information may include information associated with a first treatment that includes level A1 of attribute A and level B1 of attribute B (e.g., Treatment 1=A1-B1), information associated with a second treatment that includes level A1 of attribute A and level B2 of attribute B (e.g., Treatment 2=A1-B2), information associated with a third treatment that includes level A1 of attribute A and level B3 of attribute B (e.g., Treatment 3=A1-B3), information associated with a fourth treatment that includes level A2 of attribute A and level B1 of attribute B (e.g., Treatment 4=A2-B1), information associated with a fifth treatment that includes level A2 of attribute A and level B2 of attribute B (e.g., Treatment 5=A2-B2), and information associated with a sixth treatment that includes level A2 of attribute A and level B3 of attribute B (e.g., Treatment 6=A2-B3). As further shown, the configuration information may also include information associated with a target event, event Y, associated with the App X experiment (e.g., Target Event=Event Y).

As shown by reference number 525, experiment server 230 may provide the configuration information to application store device 250, and, as shown by reference number 530, application store device 250 may store the App X configuration information (e.g., such that application store device 250 may provide the configuration information to test devices 210 that download App X from application store device 250).

As indicated above, FIG. 5 is provided merely as an example. Other examples are possible and may differ from what was described with regard to FIG. 5.

Figure 6:
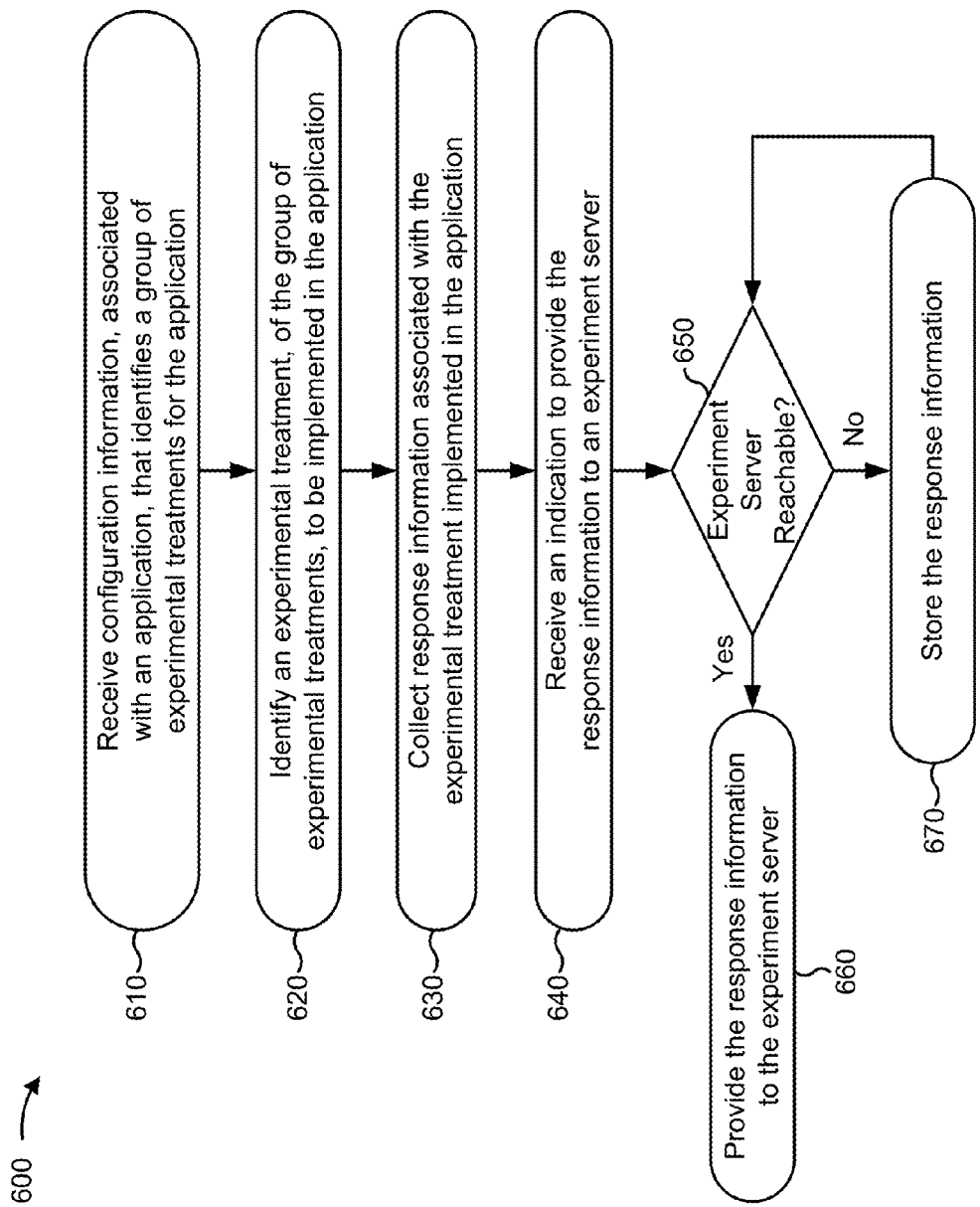
FIG. 6 is a flow chart of an example process for identifying an experimental treatment to be implemented in an application, collecting response information associated with the experimental treatment, and providing the response information.

FIG. 6 is a flow chart of an example process 600 for identifying an experimental treatment to be implemented in an application, collecting response information associated with the experimental treatment, and providing the response information. In some implementations, one or more process blocks of FIG. 6 may be performed by test device 210. In some implementations, one or more process blocks of FIG. 6 may be performed by another device or a group of devices separate from or including test device 210, such as application server 220.

As shown in FIG. 6, process 600 may include receiving configuration information, associated with an application, that identifies a group of experimental treatments for the application (block 610). For example, test device 210 may receive configuration information, associated with an application, that identifies a group of experimental treatments for the application. In some implementations, test device 210 may receive the configuration information after the configuration is provided by another device, such as application store device 250 and/or experiment server 230.

As discussed above, the configuration information may include information that identifies a group of experimental treatments associated with the application. In some implementations, test device 210 may receive the configuration information when test device 210 installs the application. For example, test device 210 may receive (e.g., based on input from a user of test device 210) an indication that test device 210 is to install the application (e.g., when the user navigates an application store application and indicates that test device 210 is to install the application). In this example, test device 210 may provide, to application store device 250, a request to provide installation information associated with the application. Application store device 250 may receive the request and may provide the installation information, including the configuration information (e.g., stored by application store device 250), to test device 210. As such, test device 210 may receive the configuration information during installation of the application.

Additionally, or alternatively, test device 210 may receive the configuration information when test device 210 receives update information associated with the application. For example, test device 210 may install the application (e.g., without receiving the configuration information), and test device 210 may receive the configuration information when application store device 250 provides (e.g., automatically, based on a request from test device 210, etc.) update information, associated with updating the application, to test device 210. Additionally, or alternatively, test device 210 may receive the configuration information based on information provided by the application developer. For example, the application developer may provide (e.g., via developer device 240) an indication that the experiment is to begin, and test device 210 may receive the configuration information (e.g., from application store device 250) based on the indication provided by the application developer.

As further shown in FIG. 6, process 600 may include identifying an experimental treatment, of the group of experimental treatments, to be implemented in the application (block 620). For example, test device 210 may identify an experimental treatment, of the group of experimental treatments, to be implemented in the application. In some implementations, test device 210 may identify the experimental treatment after test device 210 receives the configuration information. Additionally, or alternatively, test device 210 may identify the experimental treatment when test device 210 receives information (e.g., input from the user), indicating that test device 210 is to identify the experimental treatment, as discussed below.

In some implementations, test device 210 may identify the experimental treatment when test device 210 executes the application for the first time. For example, test device 210 may receive the configuration information when installing the application, and may receive (e.g., user input) an indication that test device 210 is to execute the application for the first time after installing the application. In this example, test device 210 may identify the experimental treatment when test device 210 receives the indication to execute the application. Additionally, or alternatively, test device 210 may identify the experimental treatment at another time. For example, test device 210 may identify the experimental treatment when test device 210 determines that test device 210 is to collect response information, when test device 210 determines that the experiment is to begin, when test device 210 receives an indication from experiment server 230, or at another time.

In some implementations, test device 210 may identify the experimental treatment based on information received from experiment server 230. For example, test device 210 may execute the application for the first time, and test device 210 may send, to experiment server 230, a request to provide information that identifies the experimental treatment that is to be implemented by test device 210. In this example, experiment server 230 may receive the request, may identify (e.g., based on the configuration information stored by experiment server 230) the experimental treatment, and may provide information that identifies the experimental treatment to test device 210. Test device 210 may then identify the experimental treatment based on the information received from experiment server 230. In this way, experiment server 230 may be capable of assigning an experimental treatment to each test device 210 (e.g., such that each experimental treatment is tested by multiple test devices 210).

Additionally, or alternatively, test device 210 may identify the experimental treatment based on the configuration information. For example, test device 210 may receive an indication to execute the application for the first time. However, test device 210 may be unable to reach experiment server 230 (e.g., when test device 210 is disconnected from network 260, when test device 210 is unable to communicate with experiment server 230, etc.). Here, test device 210 may identify (e.g., by randomly selecting an experimental treatment identified in the configuration information, by systematically selecting an experimental treatment identified in the configuration information, etc.) the experimental treatment based on the configuration information stored by test device 210. When test device 210 provides response information, associated with the experimental treatment, to experiment server 230 (e.g., when test device 210 is able to reach experiment server 230), test device 210 may also provide information that identifies the experimental treatment selected by test device 210. As such, experiment server 230 may track how many times each experimental treatment is implemented in order to ensure that each experimental treatment is implemented appropriately (e.g., experiment server 230 may ensure that each experimental treatment is implemented by an approximately equal number of test devices 210). In this way, the experimental treatment may be identified when test device 210 is unable to reach experiment server 230, while still allowing experiment server 230 to ensure that each experimental treatment is implemented appropriately.

In some implementations, test device 210 may implement the experimental treatment based on identifying the experimental treatment (e.g., such that the attribute levels, associated with the experimental treatment, are implemented while test device 210 is executing the application).

As further shown in FIG. 6, process 600 may include collecting response information associated with the experimental treatment implemented in the application (block 630). For example, test device 210 may collect response information associated with the experimental treatment implemented in the application. In some implementations, test device 210 may collect the response information after test device 210 identifies the experimental treatment. Additionally, or alternatively, test device 210 may collect the response information when test device 210 executes the application. Additionally, or alternatively, test device 210 may collect the response information after test device 210 determines that the experiment is to begin (e.g., based on the configuration information).

Response information, associated with the experimental treatment, may include information associated with a user interaction with the application that implements the experimental treatment. For example, the response information may include information associated with a user interaction with a user interface of the application, information associated with an amount of time the user used the application, information associated with a portion of the application displayed to the user, information associated with a search performed via the application, or another type of information.

In some implementations, the response information may include descriptive information associated with the user (e.g., a gender of the user, an age of the user, a location of the user, an income level of the user, whether the user is a high valued customer, etc.). For example, the user may provide descriptive information, associated with the user, via a user interface of the application, and test device 210 may collect the descriptive information provided by the user. Additionally, or alternatively, test device 210 may collect the descriptive information based on information stored by test device 210, application server 220, and/or another device.

Additionally, or alternatively, the response information may include sensor information collected by test device 210. For example, test device 210 may collect response information gathered by a sensor included in test device 210, such as a global positioning system (GPS) sensor, an accelerometer, or another type of sensor. In some implementations, the response information may be collected from another sensor associated with the user, such as a wrist band, a pedometer, a heart rate monitor, or the like.

In some implementations, test device 210 may collect the response information based on information included in the configuration information. For example, the configuration information may include information indicating a start time (e.g., a particular date, a particular time of day, etc.) and/or a stop time, associated with the experiment, and test device 210 may collect the response information during the time period between the start time and the stop time.

In some implementations, test device 210 may collect the response information until test device 210 detects the target event identified in the configuration information (e.g., such that the test device 210 receives an indication to provide the response information), and test device 210 may provide the response information, as discussed below. Additionally, or alternatively, test device 210 may collect the response information until test device 210 stops executing the application (e.g., when the user exits the application, etc.).

In some implementations, application server 220 may also collect response information associated with the experimental treatment. For example, if test device 210 communicates with application server 220 when using the application, application server 220 may collect response information associated with the experimental treatment implemented in the application. Here, application server 220 may collect the response information, and may provide the response information to experiment device 230 (e.g., based on an indication from test device 210, based on detecting a target event identified in the configuration information).

As further shown in FIG. 6, process 600 may include receiving an indication to provide the response information to an experiment server (block 640). For example, test device 210 may receive an indication to provide the response information to experiment server 230. In some implementations, test device 210 may receive the indication after test device 210 collects the response information. Additionally, or alternatively, test device 210 may receive the indication after test device 210 detects the target event, as discussed below.

In some implementations, test device 210 may receive the indication to provide the response information based on detecting the target event. For example, test device 210 may start collecting the response information (e.g., when test device 210 starts executing the application), and test device 210 may detect the target event (e.g., when the user interacts with the application such that the target event occurs, when the application executes such that the target event occurs, etc.). In this example, test device 210 may receive the indication to provide the response information based on detecting the target event, and may determine whether test device 210 may provide the response information to experiment server 230, as discussed below. Additionally, or alternatively, test device 210 may receive the indication to provide the response information at another time, such as when test device 210 stops executing the application, when experiment server 230 requests the response information, when application server 220 detects the target event and notifies test device 210, or the like.

In some implementations, test device 210 may receive the indication to provide the response information, and test device 210 may notify application server 220 that application server 220 is to provide response information, collected by application server 220, to experiment server 230 (e.g., when the application implements a client-server topology, as discussed above).

As further shown in FIG. 6, process 600 may include determining whether the experiment server is reachable (block 650). For example, test device 210 may determine whether the experiment server 230 is reachable. In some implementations, test device 210 may determine whether experiment server 230 is reachable after test device 210 receives the indication to provide the response information.

In some implementations, test device 210 may determine whether experiment server 230 is reachable based on information associated with test device 210. For example, test device 210 may determine whether test device 210 is connected to network 260 through which experiment server 230 may be reached. Additionally, or alternatively, test device 210 may determine whether experiment server 230 is reachable based on information associated with experiment server 230. For example, test device 210 may determine (e.g., based on information received via network 260) whether experiment server 230 is available via to network 260.

As further shown in FIG. 6, if the experiment server is reachable, then process 600 may include providing the response information to the experiment server (block 660). For example, test device 210 may determine that experiment server 230 is reachable, and test device 210 may provide the response information to experiment server 230.

In some implementations, test device 210 may provide the response information collected by test device 210. Additionally, or alternatively, test device 210 may provide information that identifies test device 210 (e.g., a device identifier, a device identification number, etc.). Additionally, or alternatively, test device 210 may provide information that identifies the experimental treatment implemented in the application (e.g., when test device 210 selects the experimental treatment, as described above). Additionally, or alternatively, test device 210 may provide other information associated with test device 210, the application, and/or the experimental treatment. In some implementations, application server 220 may also provide response information (e.g., response information collected by application server 220) to experiment server 230.

As further shown in FIG. 6, if the experiment server is not reachable, then process 600 may include storing the response information (block 670). For example, test device 210 may determine that experiment server 230 is not reachable (e.g., when test device 210 is not connected to the network, when the experiment server is unavailable, etc.), and test device 210 may store the response information.

In some implementations, test device 210 may store the response information in a memory location (e.g., a RAM, a hard disk, a memory cache, etc.) of test device 210. In some implementations, test device 210 may store the response information, and may repeat determining whether experiment server 230 is reachable (e.g., process 600 may return to block 650). For example, test device 210 may store the response information, may wait a period of time (e.g., 30 seconds, one hour, etc.), and may again determine whether experiment server 230 is reachable. In other words, test device 210 may repeat block 650 until test device 210 determines that experiment server 230 is reachable (e.g., and test device 210 may provide the response information to experiment server 230). In this way, an experiment may be conducted (e.g., by experiment device 230) even when test device 210 may be unable to communicate with experiment server 230.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
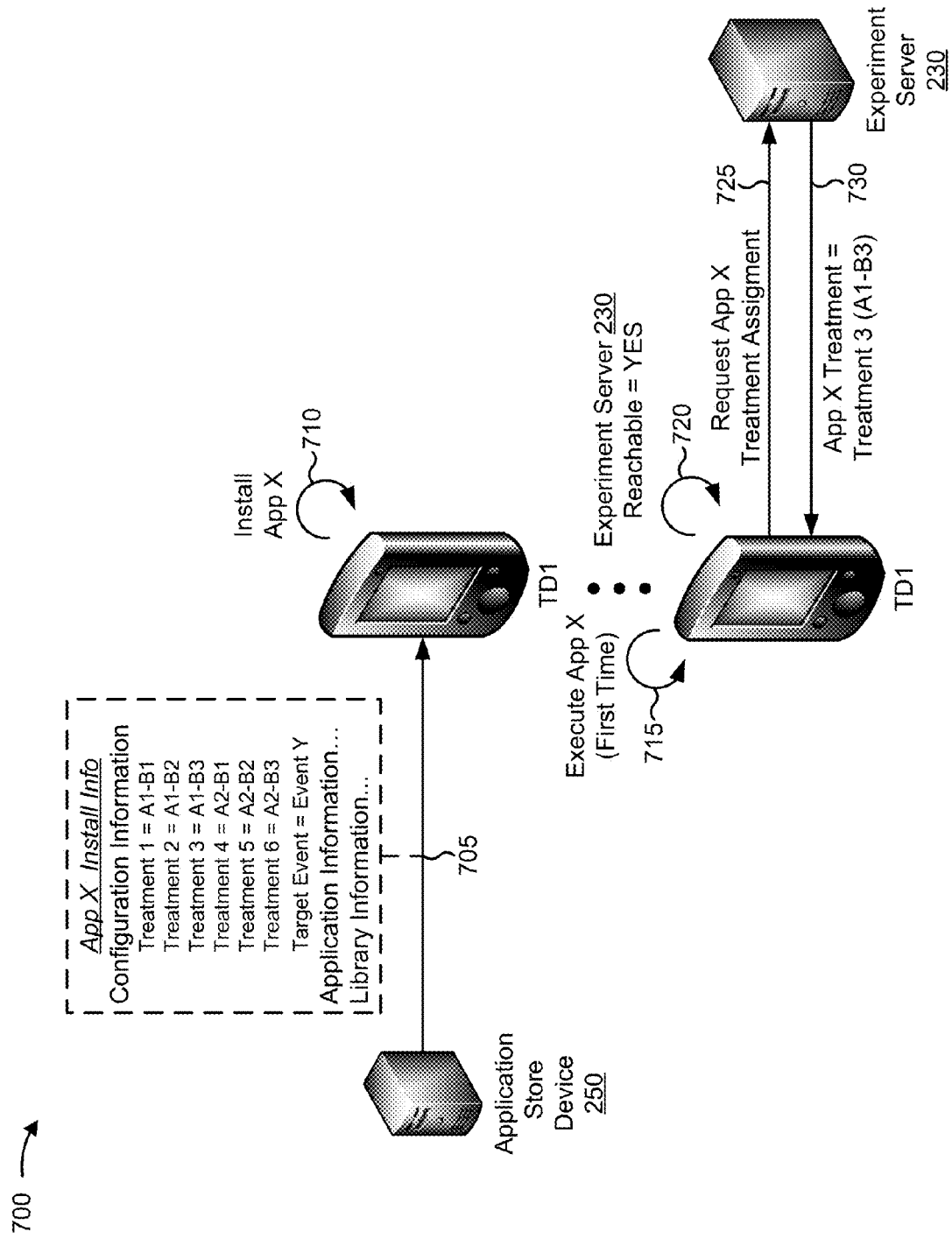
FIGS. 7A and 7B are diagrams of an example implementation relating to the example process shown in FIG. 6.
Figure 7B:
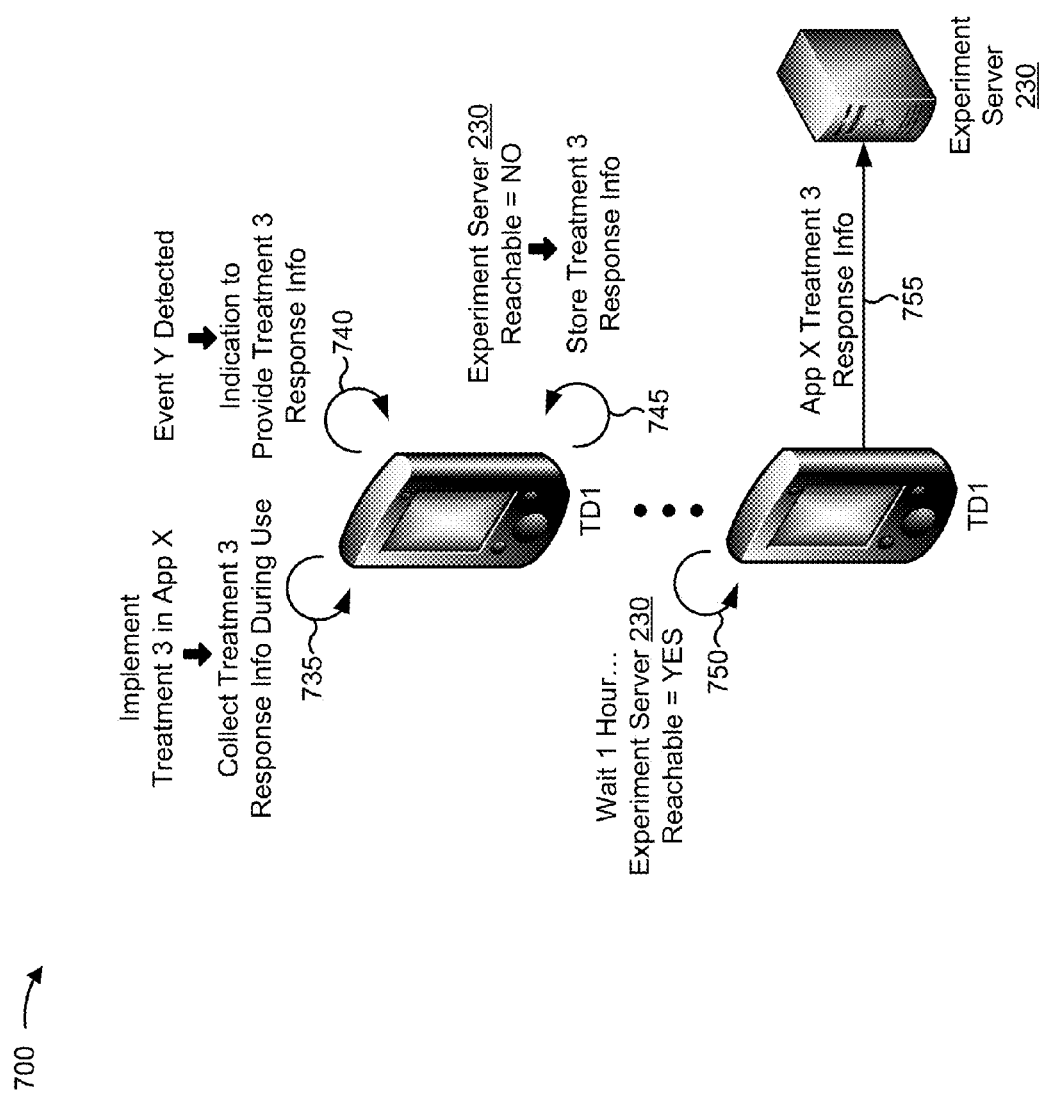

FIGS. 7A and 7B are diagrams of an example implementation 700 relating to example process 600 shown in FIG. 6. For the purposes of example implementation 700, assume that application store device 250 stores configuration information that identifies a group of experimental treatments associated with an application (e.g., App X). Also, assume that a test device, TD1, has requested installation information, associated with installing App X on TD1, from application store device 250.

As shown in FIG. 7A, and by reference number 705, application store device 250 may provide the App X installation information to TD1. As shown, the App X installation information may include App X configuration information that identifies a group of experimental treatments (e.g., combinations of attribute levels associated with App X), identified as treatment 1 through treatment 6, and information that identifies a target event, event Y, associated with App X. As also shown, the App X installation information may also include application information (e.g., other information associated with installing the application), and library information (e.g., information associated with an experimental library used to implement each experimental treatment).

As shown by reference number 710, TD1 may receive the installation information and may install App X, and, as shown by reference number 715, TD1 may execute App X for the first time. As shown by reference numbers 720, 725, and 730, TD1 may identify an experimental treatment to be implemented within App X. As shown by reference number 720, TD1 may determine that experiment server 230 is reachable (e.g., experiment server 230 reachable=YES). As shown by reference number 725, TD1 may send, to experiment server 230, a request for an App X experimental treatment assignment. Experiment server 230 may determine (e.g., based on configuration information stored experiment server 230) that an experimental treatment, identified as treatment 3, is to be implemented by TD1. As shown by reference number 730, experiment server 230 may provide, to TD1, information indicating that TD1 is to implement treatment 3. In other words, TD1 may determine (e.g., based on information received from experiment server 230) that TD1 is to implement level 1 of attribute A and level 3 of attribute B when executing App X.

As shown in FIG. 7B, and by reference number 735, TD1 may implement treatment 3 within App X, and may begin to collect response information, associated with treatment 3, while the user is using App X. As shown by reference number 740, TD1 may detect event Y associated with App X, which acts as an indication to provide the treatment 3 response information to experiment server 230. For the purposes of example implementation 700, assume that TD1 disconnects from the network after receiving the information indicating that TD1 is to implement treatment 3. As shown by reference number 745, TD1 may determine that experiment server 230 is not reachable, and TD1 may store (e.g., in a memory location of TD1) the treatment 3 response information. As shown by reference number 750, TD1 may wait for one hour, and may determine that experiment server 230 is now reachable (e.g., assume that TD1 has reconnected to the network). As shown by reference number 755, TD1 may then provide the response information to experiment server 230.

As indicated above, FIGS. 7A and 7B are provided merely as an example. Other examples are possible and may differ from what was described with regard to FIGS. 7A and 7B.

Figure 8A:
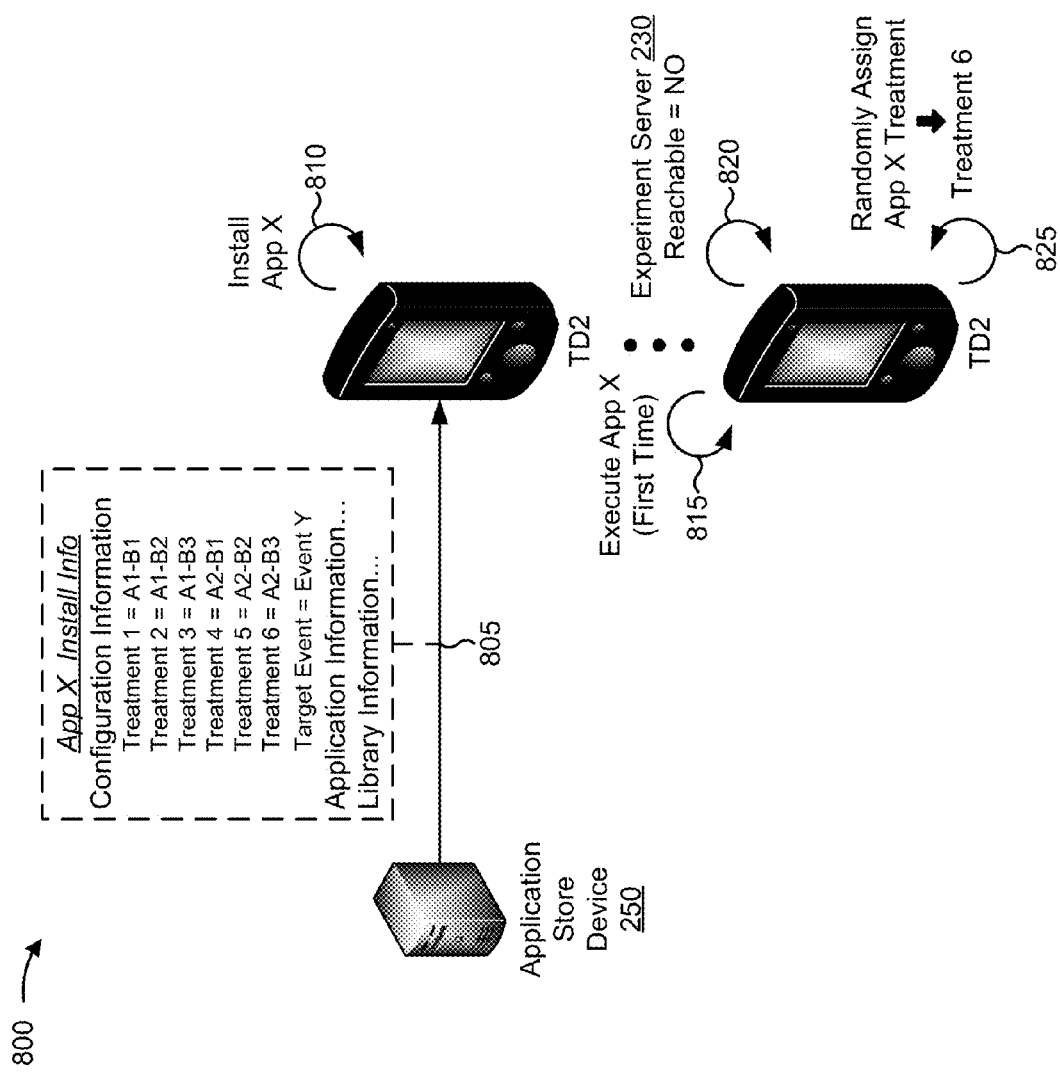
FIGS. 8A and 8B are diagrams of an additional example implementation relating to the example process shown in FIG. 6.
Figure 8B:
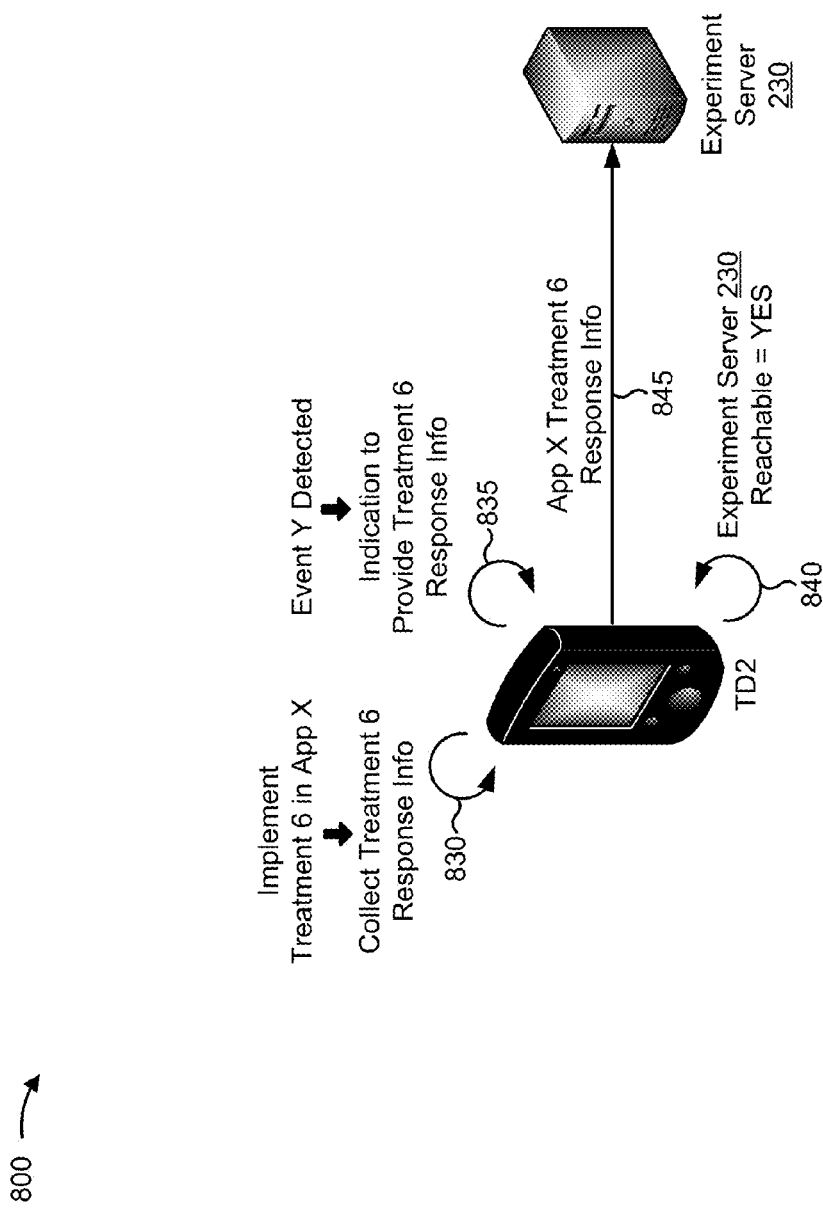

FIGS. 8A and 8B are diagrams of an additional example implementation 800 relating to example process 600 shown in FIG. 6. For the purposes of example implementation 800, assume that application store device 250 stores configuration information that identifies a group of experimental treatments associated with an application (e.g., App X). Also, assume that a test device, TD2, has requested installation information, associated with installing App X on TD2, from application store device 250.

As shown in FIG. 8A, and by reference number 805, application store device 250 may provide the App X installation information to TD2. As shown, the App X installation information may include App X configuration information that identifies a group of experimental treatments, identified as treatment 1 through treatment 6, and information that identifies a target event (e.g., event Y) associated with App X. As also shown, the App X installation information may include application information (e.g., other information associated with installing the application), and library information (e.g., information associated with an experimental library used to implement each experimental treatment).

As shown by reference number 810, TD2 may receive the installation information and may install App X, and, as shown by reference number 815, TD2 may execute App X for the first time. As shown by reference numbers 820 and 825, TD2 may identify an experimental treatment to be implemented within App X. As shown by reference number 820, TD2 may determine that experiment server 230 is not reachable (e.g., experiment server 230 reachable=NO). As shown by reference number 825, TD2 may then randomly assign (e.g., based on the configuration information stored by TD2) treatment 6 to be implemented in App X (e.g., since TD2 is unable to identify an experimental treatment based on information received from experiment server 230). In other words, TD2 may determine (e.g., based on randomly selecting an experimental treatment included in the configuration information) that TD2 is to implement level 2 of attribute A and level 3 of attribute B when executing App X.

As shown in FIG. 8B, and by reference number 830, TD2 may implement treatment 6 within App X, and may begin to collect response information, associated with treatment 6, while the user of TD2 is using App X. As shown by reference number 835, TD2 may detect event Y associated with App X, which acts as an indication to provide the treatment 6 response information to experiment server 230.

As shown by reference number 840, TD2 may determine that experiment server 230 is reachable (e.g., assume that TD2 has reconnected to the network since initially executing the application), and, as shown by reference number 845, TD2 may provide the treatment 6 response information to experiment server 230.

As indicated above, FIGS. 8A and 8B are provided merely as an example. Other examples are possible and may differ from what was described with regard to FIGS. 8A and 8B.

Figure 9A:
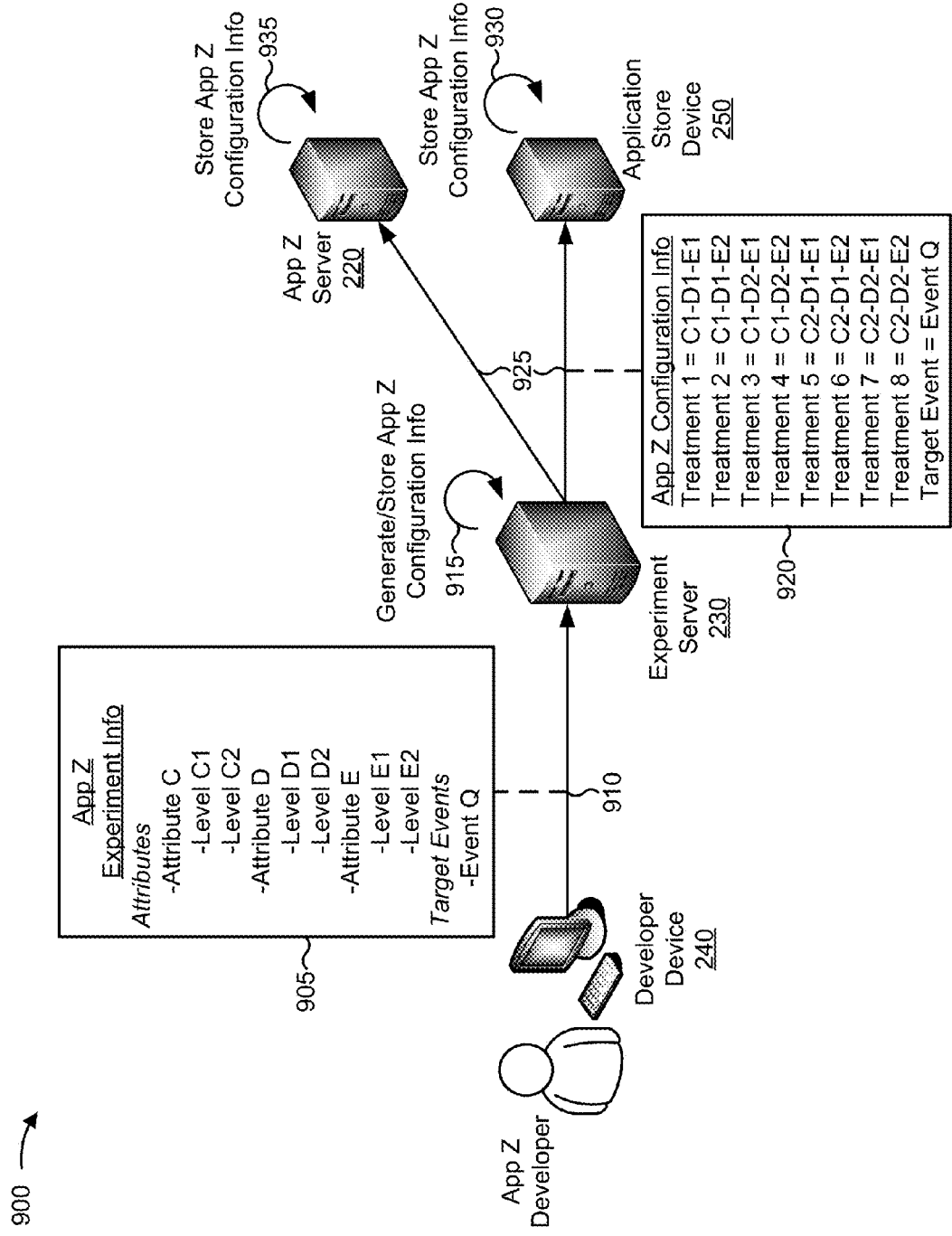
FIGS. 9A-9C are diagrams of an example implementation relating to the example processes shown in FIG. 4 and FIG. 6.
Figure 9B:
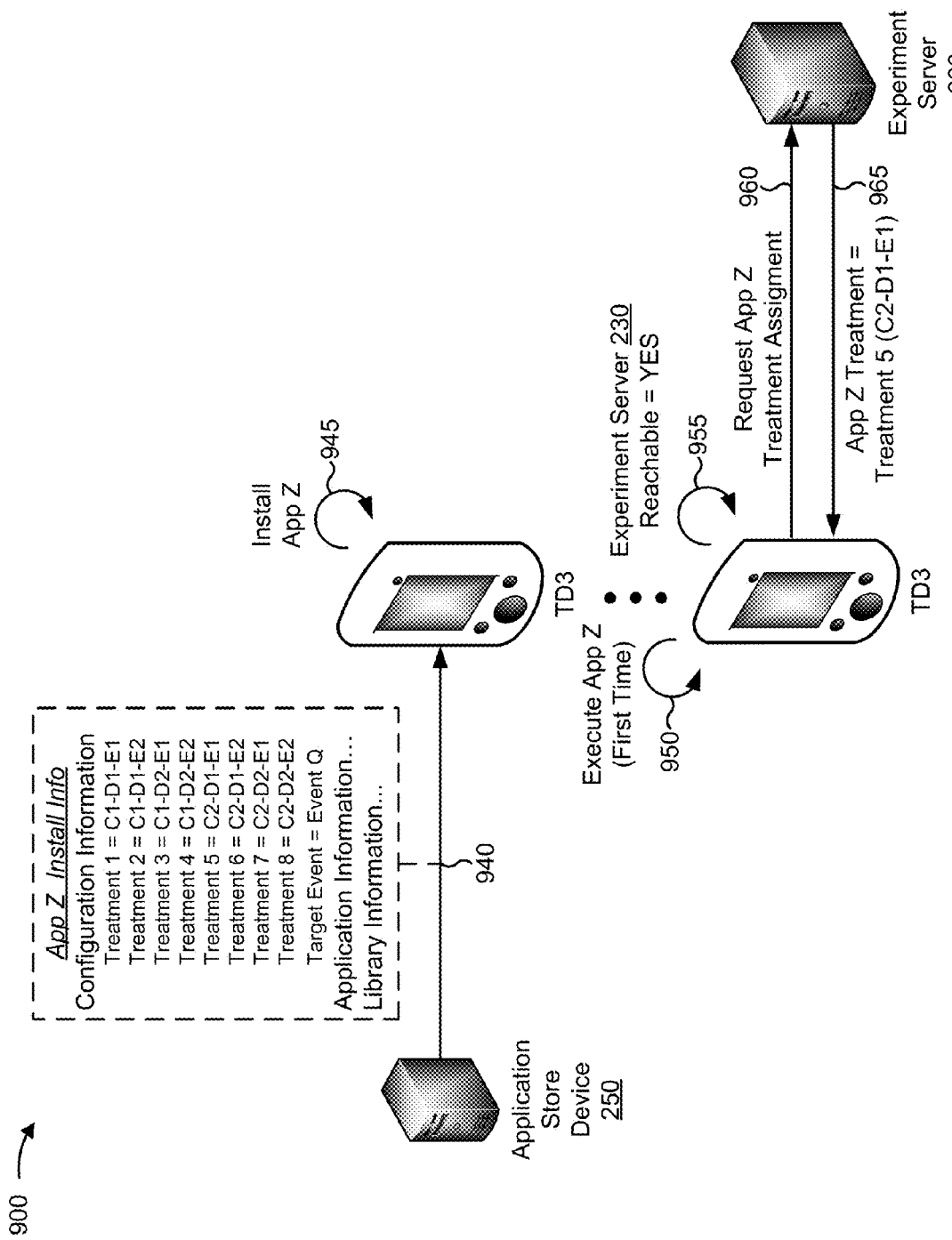
Figure 9C:
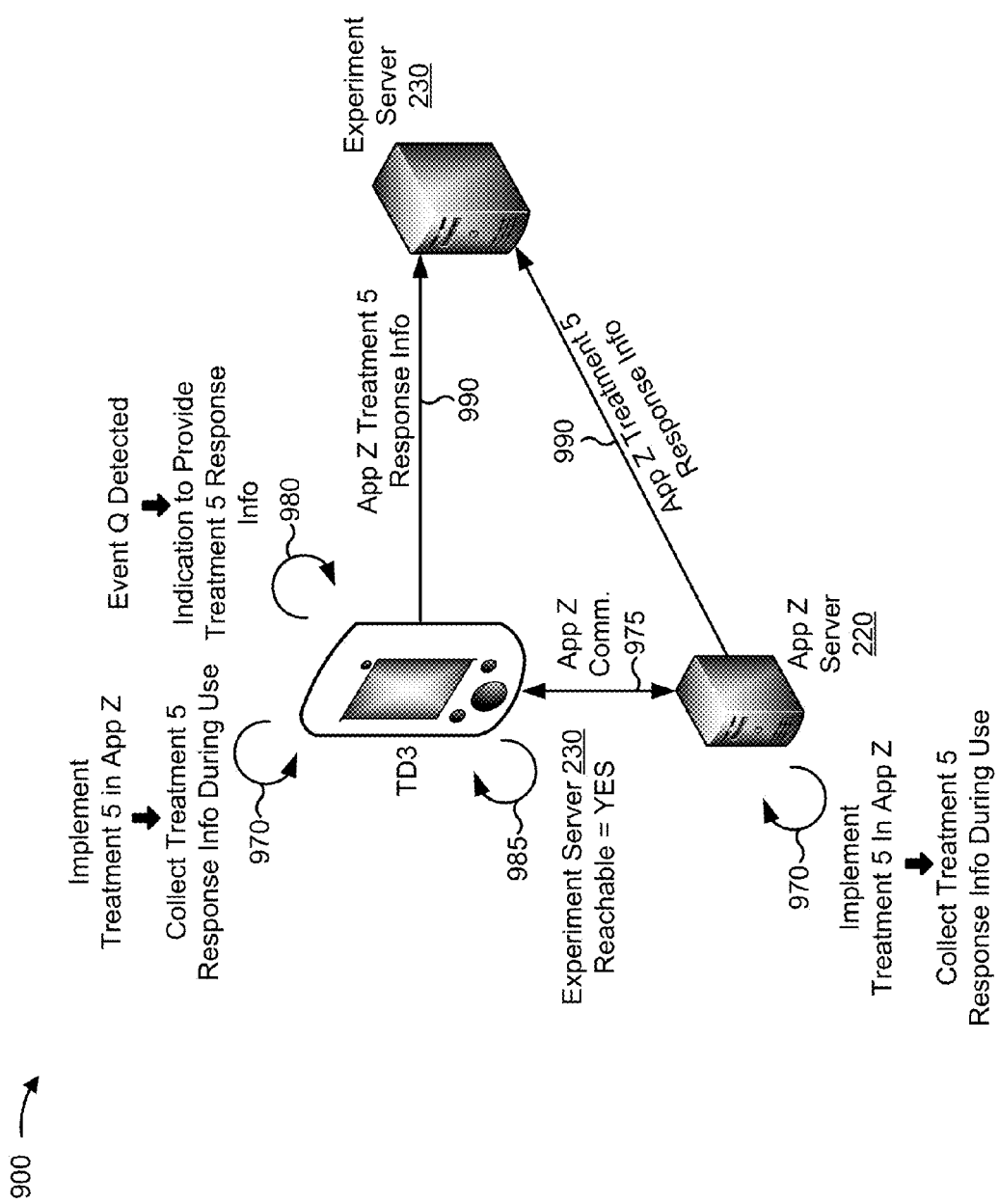

FIGS. 9A-9C are diagrams of an example implementation 900 relating to example processes 400 and 600 shown in FIG. 4 and FIG. 6, respectively. For the purposes of example implementation 900, assume that an application developer associated with an application, App Z, wishes to conduct an experiment, associated with App Z, based on a group of attributes associated with the application and a target event associated with the application. Further, assume that App Z implements a client-server topology such that App Z requires communication between test devices executing App Z and an App Z server device associated with App Z.

As shown in FIG. 9A, the App Z application developer may provide, via a user interface of developer device 240, experiment information associated with App Z. As shown by reference number 905, the experiment information may identify a first attribute (e.g., attribute C) associated with the experiment, and information associated with two levels of the first attribute (e.g., level C1 and level C2). As further shown, the experiment information may also identify a second attribute (e.g., attribute D) associated with the experiment, and information associated with two levels of the second attribute (e.g., level D1 and level D2). As also shown, the experiment information may also identify a third attribute (e.g., attribute E) associated with the experiment, and information associated with two levels of the third attribute (e.g., level E1 and level E2). As further shown, the experiment information may also include information associated with a target event (e.g., event Q) associated with the experiment. As shown by reference number 910, developer device 240 may provide the experiment information to experiment server 230.

As shown by reference number 915, experiment server 230 may receive the App Z experiment information, and may generate and store configuration information associated with the App Z experiment. For the purposes of example implementation 900, assume that experiment device 230 is configured to generate configuration information that includes all possible combinations of attribute levels for the experiment.

As shown by reference number 920, the App Z configuration information may include information associated with a first treatment that includes level C1 of attribute C, level D1 of attribute D, and level E1 of attribute E (e.g., Treatment 1=C1-D1-E1), information associated with a second treatment that includes level C1 of attribute C, level D1 of attribute D, and level E2 of attribute E (e.g., Treatment 2=C1-D1-E2), information associated with a third treatment that includes level C1 of attribute C, level D2 of attribute D, and level E1 of attribute E (e.g., Treatment 3=C1-D2-E1), information associated with a fourth treatment that includes level C1 of attribute C, level D2 of attribute D, and level E2 of attribute E (e.g., Treatment 4=C1-D2-E2), information associated with a fifth treatment that includes level C2 of attribute C, level D1 of attribute D, and level E1 of attribute E (e.g., Treatment 5=C2-D1-E1), information associated with a sixth treatment that includes level C2 of attribute C, level D1 of attribute D, and level E2 of attribute E (e.g., Treatment 6=C2-D1-E2), information associated with a seventh treatment that includes level C2 of attribute C, level D2 of attribute D, and level E1 of attribute E (e.g., Treatment 7=C2-D2-E1), and information associated with an eighth treatment that includes level C2 of attribute C, level D2 of attribute D, and level E2 of attribute E (e.g., Treatment 8=C2-D2-E2). As further shown, the configuration information may also include information associated with the target event, event Q, associated with the App Z experiment (e.g., Target Event=Event Q).

As shown by reference number 925, experiment server 230 may provide the configuration information to application store device 250 and to the App Z server. As shown by reference number 930, application store device 250 may store the App Z configuration information (e.g., such that application store device 250 may provide the configuration information to test devices 210 that download App Z from application store device 250). As shown by reference number 935, the App Z server may also store the configuration information (e.g., such that the App Z server may implement experimental treatments when test devices 210 communicate with the App Z server while executing the application).

For the purposes of FIG. 9B, assume that a test device, TD3, has requested installation information, associated with installing App Z on TD3, from application store device 250. As shown by reference number 940, application store device 250 may provide App Z installation information (e.g., stored by application store device 250) to TD3. As shown, the App Z installation information may include the App Z configuration information that identifies the group of experimental treatments and information that identifies event Q associated with the App Z experiment. As also shown, the App Z installation information may include application information (e.g., other information associated with installing the application), and library information (e.g., information associated with an experimental library used to implement each experimental treatment).

As shown by reference number 945, TD3 may receive the installation information and may install App Z, and, as shown by reference number 950, TD3 may execute App Z for the first time. As shown by reference numbers 955, 960, and 965, TD3 may identify an experimental treatment to be implemented within App Z. As shown by reference number 955, TD3 may determine that experiment server 230 is reachable (e.g., experiment server 230 reachable=YES). As shown by reference number 960, TD3 may then send, to experiment server 230, a request for an App Z experimental treatment assignment. Experiment server 230 may determine (e.g., based on configuration information stored experiment server 230) that an experimental treatment, identified as treatment 5, is to be implemented by TD3. As shown by reference number 965, experiment server 230 may provide, to TD3, information indicating that TD3 is to implement treatment 5. In other words, TD3 may determine (e.g., based on information received from experiment server 230) that TD3 is to implement level 2 of attribute C, level 1 of attribute D, and level 1 of attribute E when executing App Z.

As shown in FIG. 9C, and by reference number 970, TD3 and the App Z server may implement treatment 5 within App Z (e.g., assume that TD3 notifies the App Z server the treatment 5 is to be implemented), and TD3 and the App Z server may begin to collect response information, associated with treatment 5, while the user of TD3 is using App Z (e.g., while TD3 is communicating with the App Z server, as shown by reference number 975). As shown by reference number 980, TD3 may detect event Q associated with App Z, which acts as an indication to provide the treatment 5 response information to experiment server 230. TD3 may detect event Q, and may notify the App Z server that the App Z server is to provide treatment 5 response information (e.g., collected by the App Z server) to experiment server 230. In some implementations, the App Z server may detect event Q and may notify TD3 that TD3 is to provide treatment 5 response information (e.g., collected by TD3) to experiment server 230. As shown by reference number 985, TD3 may determine that experiment server 230 is reachable (e.g., assume that TD3 has remained connected to the network since initially executing the application). As shown by reference number 990, TD3 and the App Z server may provide the treatment 5 response information to experiment server 230.

As indicated above, FIGS. 9A-9C are provided merely as an example. Other examples are possible and may differ from what was described with regard to FIGS. 9A-9C.

FIG. 10 is a flow chart of an example process 1000 for analyzing response information, associated with a group of experimental treatments for an application, and providing a result associated with analyzing the response information. In some implementations, one or more process blocks of FIG. 10 may be performed by experiment server 230. In some implementations, one or more process blocks of FIG. 10 may be performed by another device or a group of devices separate from or including experiment server 230, such as another device included in environment 200.

As shown in FIG. 10, process 1000 may include receiving response information associated with a group of experimental treatments for an application (block 1010). For example, experiment server 230 may receive response information associated with a group of experimental treatments. In some implementations, experiment server 230 may receive the response information when test devices 210 and/or application servers 220 provide the response information. Additionally, or alternatively, experiment server 230 may receive the response information when experiment server 230 requests the response information from another device, such as test device 210, application server 220, or another device.

Response information, associated with an experimental treatment, may include information associated with a user interaction with an application that implements the experimental treatment, as described above. As described above, the response information may also include descriptive information, associated with the user of test device 210, and/or may include sensor information associated with test device 210.

In some implementations, experiment server 230 may receive response information from multiple test devices 210 that have implemented the group of experimental treatments. For example, experiment server 230 may conduct an experiment (e.g., designed by an application developer) that includes ten experimental treatments implemented by 1000 test devices 210. In this example, each test device 210 may implement one of the ten experimental treatments (e.g., such that each of the ten experimental treatments is implemented by 100 test devices 210). Here, each test device 210 may implement an experimental treatment, and may provide response information, associated with the experimental treatment, as described above, to experiment server 230.

Additionally, or alternatively, experiment server 230 may receive outcome information associated with an experimental treatment. Outcome information may include information, associated with the application and not immediately available to experiment server 230, that may be used to perform an analysis of the response information. For example, assume that the user of test device 210 uses the application to book a hotel stay, and that booking a hotel stay using the application is a target event. As described above, test device 210 may provide response information (e.g., collected by test device 210) to experiment server 230 immediately after the user books the hotel stay using the application. In this example, the outcome information may include information, associated with the user's hotel stay, that may be provided to experiment server 230 after and/or during the user's hotel stay (e.g., amenity purchases, food purchases, mini-bar purchases, extension of the hotel stay, etc.). Here, the outcome information may be provided at a later time since the outcome information was not available at the time the response information was received by experiment server 230. In some implementations, the outcome information may be provided by application server 220 and/or by another device associated with the application.

Additionally, or alternatively, experiment server 230 may receive financial information associated with the application. Financial information, associated with the application, may include a cost and/or a value associated a group of users (e.g., male users, users over 40, high value users, etc.), an experimental treatment, and/or an outcome associated with the application. For example, experiment device 230 may receive cost and/or value information associated with a user included in a group of users, such as a group of high value users. In this example, if the application is a hotel stay booking application, and the high value user signs up (e.g., via the application) for membership (e.g., a rewards point program membership, etc.) associated with the hotel, this may provide value at a later time. Here, experiment server 230 may receive financial information (e.g., an estimated future value of the high value user).

As an additional example, experiment server 230 may receive cost and/or value information associated with a group of experimental treatments, such as a group of experimental treatments that offer different discounts to users. For example, if the group of experimental treatments includes different offers for users (e.g., in order to incentivize the users to book a hotel stay using the application), then providing each offer may result in a particular financial cost. Here, experiment server 230 may receive financial information (e.g., an estimated cost of each discount offer). In this way, experiment server 230 may be provided with financial information that allows experiment server 230 to perform an analysis that identifies an experimental treatment that maximizes overall revenue (e.g., along with determining which experimental treatment results in the maximum probability of target events). In some implementations, the financial information may be determined by experiment server 230, provided by application server 220 and/or provided by another device associated with the application.

As further shown in FIG. 10, process 1000 may include performing an analysis based on the response information (block 1020). For example, experiment server 230 may perform an analysis based on the response information. In some implementations, experiment server 230 may perform the analysis after experiment server 230 receives the response information associated with the group of experimental treatments. Additionally, or alternatively, experiment server 230 may perform the analysis when experiment server 230 determines that the experiment has concluded (e.g., when experiment server 230 stores timing information associated with the experiment). Additionally, or alternatively, experiment server 230 may perform the analysis when experiment server 230 receives information, indicating that experiment server 230 is to perform the analysis, from another device, such as developer device 240.

In some implementations, experiment server 230 may perform the analysis based on the response information (e.g., including the descriptive information and/or the sensor information), the outcome information, and/or the financial information received by experiment server 230. In some implementations, experiment server 230 may perform (e.g., using a primary experiment engine hosted by experiment server 230) a statistical analysis of the response information, the outcome information, and/or the financial information.

In some implementations, experiment server 230 may perform the analysis in order to determine which experimental treatment resulted in the most occurrences of a target event (e.g., which experimental treatment resulted in the greatest number of hotel bookings, the most advertisement clicks, the most product purchases, etc.). Additionally, or alternatively, experiment server 230 may perform the analysis in order to determine which experimental treatment is an optimal experimental treatment (e.g., which experimental treatment has the highest statistical probability of resulting in an occurrence of the target event). Additionally, or alternatively, experiment server 230 may perform the analysis in order to determine which experimental treatment may provide the most value (e.g., increased revenue, decreased costs, increased savings, etc.).

In some implementations, experiment server 230 may perform an analysis, associated with an application, based on two or more target events (e.g., when the application developer specifies two or more target events in the experiment information). For example, experiment server 230 may perform an analysis associated with two target events, where the cost of an occurrence of a first target event may be that a second target event will not occur. In some implementations, experiment server 230 may perform an analysis in order to determine which experimental treatment is optimal for each of the two or more target events (e.g., each target event may have a different optimal experimental treatment). Additionally, or alternatively, experiment server 230 may perform an analysis that considers multiple target events simultaneously. For example, experiment server 230 may determine (e.g., based on input from the application developer) a weight factor (e.g., a numerical value between 0 and 1, etc.) associated with each target event, and experiment server 230 may perform an analysis that incorporates the weight factor associated with each target event. In this example, experiment server 230 may perform an analysis to determine which experimental treatment is the optimal experimental treatment based on the weight factor associated with each target event. In some implementations, the application developer may modify (e.g., via developer device 240) the weight factor in order to emphasize importance of a target event (e.g., when a first target event is more important than a second target event for a temporary period of time, etc.).

As further shown in FIG. 10, process 1000 may include providing a result associated with analyzing the response information (block 1030). For example, experiment server 230 may provide a result associated with the analysis based on the response information. In some implementations, experiment server 230 may provide the result after experiment server 230 performs the analysis based on the response information. Additionally, or alternatively, experiment server 230 may provide the result based on receiving (e.g., from developer device 240) a request to provide the result. Additionally, or alternatively, experiment server 230 may provide the result when experiment server 230 receives information, indicating that experiment server 230 is to provide the result, from another device.

In some implementations, experiment server 230 may provide the result such that the application developer may view the result. For example, experiment server 230 may provide the result to developer device 240. Developer device 240 may provide, for display via a display device associated with developer device 240, information associated with the result, such that the application developer may view the result.

In some implementations, experiment server 230 may cause (e.g., via developer device 240) an optimal treatment, identified by the result, to be implemented in all test devices 210 and/or application servers 220 (e.g., when the experiment is over and the application developer wishes to implement the optimal experimental treatment). Additionally, or alternatively, experiment server 230 may cause the optimal treatment to be implemented in a portion (e.g., 20%, 50%, etc.) of test devices 210 and application servers 220, and experiment server 230 may continue gathering response information, associated with the group of experimental treatments (e.g., in order to determine a more accurate result associated with the experiment).

In this way, experiment server 230 may receive response information, associated with a group of experimental treatments for an application, and may perform an analysis based on the response information to determine an optimal experimental treatment for the application. The optimal treatment may then be implemented in the application (e.g., executing on test devices 210 and/or application servers 220), such that the application is optimized to meet a goal.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
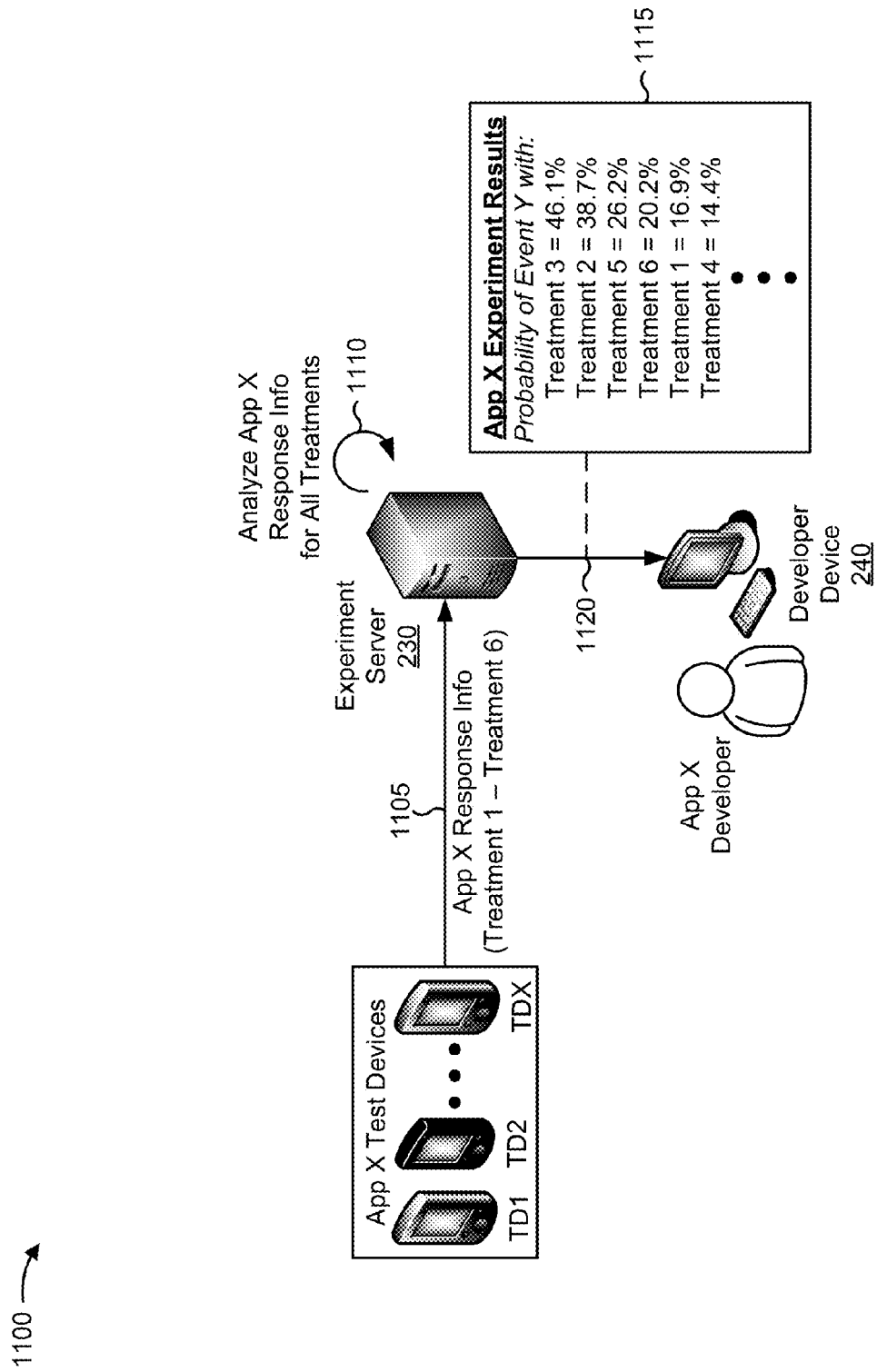
FIG. 11 is a diagram of an example implementation relating to the example process shown in FIG. 10.

FIG. 11 is a diagram of an example implementation 1100 relating to example process 1000 shown in FIG. 10. For the purposes of example implementation 1100, assume a group of test devices 210, TD1 through TDX, have collected response information associated with a group of experimental treatments (e.g., treatment 1 through treatment 6) for an application identified as App X. Further, assume that each test device 210 has detected a target event, event Y, indicating that each test device 210 is to provide its respective response information to experiment server 230. Finally, assume that experiment server 230 has received an indication (e.g., based on input from the App X developer) to perform an analysis of response information collected by test devices 210.

As shown in FIG. 11, and by reference number 1105, the group of test devices may provide their respective App X response information to experiment server. For the purposes of example implementation 1100, assume that the response information, received by experiment server 230, includes response information associated with each experimental treatment of the group of experimental treatments. As shown by reference number 1110, experiment server 230 may perform an analysis of the response information for treatment 1 through treatment 6. For the purposes of example implementation 1100, assume that experiment server 230 is configured to analyze the response information in order to determine an optimal experimental treatment that results in the highest probability that event Y will occur. As shown by reference number 1115, experiment server 230 may determine, based on the analysis, that experimental treatment 3 is the optimal experimental treatment (e.g., Probability of Event Y with: Treatment 3=46.1%, Treatment 2=38.7%, Treatment 5=26.2%, Treatment 6=20.2%, Treatment 1=16.9%, Treatment 4=14.4%). As shown by reference number 1120, experiment server 230 may provide information associated with the result to developer device 240, the App X developer may view the result, and act accordingly (e.g., by causing treatment 3 to be implemented in devices executing App X, by indicating that additional response information to be collected, etc.).

As indicated above, FIG. 11 is provided merely as an example. Other examples are possible and may differ from what was described with regard to FIG. 11.

Implementations described herein may allow an experiment server to conduct experiments, associated with optimizing an application, on a test device when the test device is unable to communicate with the experiment server (e.g., when the test device is disconnected from the network).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, experiment information,
        the experiment information being associated with an experiment for optimizing an application, and
        the experiment information including information associated with a group of attributes associated with the experiment;
    generating, by the device, configuration information based on the group of attributes associated with the experiment information,
        the configuration information including information that identifies a group of experimental treatments associated with the experiment;
    providing, by the device, the configuration information,
        the configuration information being provided to cause the group of experimental treatments to be implemented in the application by a group of test devices;
    receiving, by the device, response information associated with the group of experimental treatments,
        the response information being provided by the group of test devices;
    receiving, by the device, descriptive information associated with users of the group of test devices;
    receiving, by the device, outcome information associated with the group of experimental treatments;
    receiving, by the device, financial information associated with the group of experimental treatments;
    analyzing, by the device, the response information to determine a result associated with the experiment based on two or more of the descriptive information, the outcome information, or the financial information; and
    providing, by the device, the result to allow the application to be optimized based on the result.

2. The method of claim 1, further comprising:
    receiving, from a test device of the group of test devices, a request associated with identifying an experimental treatment to be implemented in the application by the test device;
    determining, based on the configuration information, the experimental treatment to be implemented in the application by the test device; and
    providing a response to the test device,
        the response including information that identifies the experimental treatment to be implemented in the application by the test device.

3. The method of claim 1, further comprising:
    receiving other response information associated with the group of experimental treatments,
        the other response information being provided by a server device associated with the application; and
    analyzing the other response information to determine another result associated with the experiment.

4. The method of claim 1, further comprising:
    determining, based on the result, a particular experimental treatment of the group of experimental treatments; and
    providing information associated with the particular experimental treatment to cause the group of test devices to implement the particular experimental treatment.

5. The method of claim 1, where the configuration information includes:
    information indicating a start time for the experiment;
    information indicating a stop time for the experiment;
    information identifying a version of the application associated with starting the experiment; or
    information identifying a version of the application associated with stopping the experiment.

6. The method of claim 1,
    where the configuration information further includes information identifying a target event associated with the experiment, and
    where the target event comprises one of:
        a purchase being completed using the application, an interaction occurring with a particular user interface element via the application, or a service being signed up for using the application.

7. A device, comprising:

a memory to store instructions; and one or more processors that execute the instructions to cause the one or more processors to:

receive configuration information associated with an experiment associated with optimizing an application, the configuration information identifying a group of experimental treatments associated with the experiment, the configuration information including information identifying a target event associated with the experiment, and the target event comprising one of:

a purchase being completed using the application, or a service being signed up for using the application;

identify an experimental treatment, of the group of experimental treatments, to be implemented in the application;

implement the experimental treatment in the application;

collect response information, associated with the experimental treatment, based on implementing the experimental treatment, the response information including information regarding an interaction of a user with a user interface of the application;

detect the target event associated with the experiment, the target event being detected indicating that the response information is to be provided to an experiment server associated with the experiment;

determine, after detecting the target event, that the experiment server is unreachable; and store the response information based on determining that the experiment server is unreachable, the response information being stored to allow the response information to be provided to the experiment server at a later time, and the response information being provided to the experiment server to permit the experiment server to analyze the response information to determine a result of the experiment.

8. The device of claim 7, where the one or more processors are further to: wait for a period of time after determining that the experiment server is unreachable; determine that the experiment server is reachable after waiting for the period of time; and provide the response information to the experiment server after determining that the experiment server is reachable.

9. The device of claim 7, where, when identifying the experimental treatment to be implemented in the application, the one or more processors are to:

determine that the device is unable to communicate with the experiment server; and select, based on determining that the device is unable to communicate with the experiment server, the experimental treatment to be implemented in the application, the experimental treatment being selected based on the configuration information.

10. The device of claim 7, where the one or more processors are further to:

store information identifying the experimental treatment, the information identifying the experimental treatment being stored to allow the information identifying the experimental treatment to be provided to the experiment server at the later time.

11. The device of claim 7, where the one or more processors are further to:

determine that the device is able to communicate with the experiment server;

provide, to the experiment server, a request associated with identifying the experimental treatment; and receive a response that identifies the experimental treatment to be implemented in the application; and where the one or more processors, when identifying the experimental treatment to be implemented in the application, are to:

identify the experimental treatment based on the response that identifies the experimental treatment to be implemented in the application.

12. The device of claim 7, where the one or more processors, are further to:

determine descriptive information associated with the user; and store the descriptive information associated with the user.

13. The device of claim 7, where the one or more processors are further to:

receive configuration information associated with multiple experiments, the configuration information, associated with the multiple experiments, allowing the multiple experiments, associated with the application, to be conducted at the same time, and the multiple experiments including the experiment.

14. A non-transitory computer-readable medium storing instructions, the instructions comprising:

one or more instructions that, when executed by one or more processors, cause the one or more processors to:

receive configuration information associated with an experiment and an application, the configuration information including information that identifies a group of experimental treatments associated with the experiment and information that identifies a target event associated with the experiment, and the target event comprising one of:

a purchase being completed using the application, or a service being signed up for using the application;

identify an experimental treatment, of the group of experimental treatments, to be implemented in the application;

cause the experimental treatment to be implemented in the application;

collect response information, associated with the experimental treatment, based on causing the experimental treatment to be implemented, the response information including information regarding an interaction of a user with a user interface of the application;

receive an indication to provide the response information, the indication being associated with an occurrence of the target event;

determine, after receiving the indication, that the response information cannot be provided to an experiment server; and store, based on determining that the response information cannot be provided to the experiment server, the response information to allow the response information to be provided to the experiment server at a later time, the response information being provided to the experiment server to permit the experiment server to analyze the response information and determine a result associated with experiment.

15. The non-transitory computer-readable medium of claim 14, where the one or more instructions, when executed by the one or more processors, further cause the one or more processors to:

wait for a period of time after determining that the response information cannot be provided to the experiment server;

determine that the response information can be provided to the experiment server after waiting for the period of time; and provide the response information to the experiment server after determining that the response information can be provided to the experiment server.

16. The non-transitory computer-readable medium of claim 14, where the one or more instructions, that cause the one or more processors to identify the experimental treatment to be implemented in the application, cause the one or more processors to:

determine that the experiment server cannot be reached; and select, based on determining that the experiment server cannot be reached, the experimental treatment to be implemented in the application, the experimental treatment being selected based on the configuration information.

17. The non-transitory computer-readable medium of claim 14, where the one or more instructions, that cause the one or more processors to store the response information, cause the one or more processors to:

store information identifying the experimental treatment, the information identifying the experimental treatment being stored to allow the information identifying the experimental treatment to be provided to the experiment server at the later time.

18. The non-transitory computer-readable medium of claim 14, where the one or more instructions, when executed by the one or more processors, further cause the one or more processors to:

determine that the experiment server can be reached;

provide, to the experiment server, a request associated with identifying the experimental treatment to be implemented in the application; and receive a response that identifies the experimental treatment to be implemented in the application; and where the one or more instructions, that cause the one or more processors to identify the experimental treatment to be implemented in the application, cause the one or more processors to:

identify the experimental treatment based on the response that identifies the experimental treatment to be implemented in the application.

19. The non-transitory computer-readable medium of claim 14, where the one or more instructions, when executed by the one or more processors, further cause the one or more processors to:

determine sensor information associated the application; and store the sensor information associated with the application.

20. The non-transitory computer-readable medium of claim 14, where the one or more instructions, when executed by the one or more processors, further cause the one or more processors to:

receive configuration information associated with multiple experiments, the configuration information, associated with the multiple experiments, allowing the multiple experiments, associated with the application, to be conducted at the same time, and the multiple experiments including the experiment.

* * * * *